(12) United States Patent
Petite et al.

(10) Patent No.: US 7,756,086 B2
(45) Date of Patent: Jul. 13, 2010

(54) METHOD FOR COMMUNICATING IN DUAL-MODES

(75) Inventors: Thomas D. Petite, Douglasville, GA (US); Richard Huff, Conyers, GA (US); David P. Aldoretta, Duluth, GA (US)

(73) Assignee: Sipco, LLC, Atlanta, GA (US)

( * ) Notice: Subject to any disclaimer, the term of this patent is extended or adjusted under 35 U.S.C. 154(b) by 1169 days.

(21) Appl. No.: 10/792,464

(22) Filed: Mar. 3, 2004

(65) Prior Publication Data
US 2005/0195768 A1    Sep. 8, 2005

(51) Int. Cl.
*H04B 7/216* (2006.01)
*H04B 1/00* (2006.01)
*H04B 1/18* (2006.01)
*H04W 72/00* (2009.01)

(52) U.S. Cl. .................. 370/335; 455/63.3; 455/161.1; 455/454

(58) Field of Classification Search ................ 370/352, 370/342, 343, 344, 349, 350, 335; 340/870.11
See application file for complete search history.

(56) References Cited

U.S. PATENT DOCUMENTS

| | | | |
|---|---|---|---|
| 3,665,475 A | 5/1972 | Gram |
| 3,705,385 A | 12/1972 | Batz |
| 3,723,876 A | 3/1973 | Seaborn, Jr. |
| 3,742,142 A | 6/1973 | Martin |
| 3,848,231 A | 11/1974 | Wooten |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |
| 3,925,763 A | 12/1975 | Wadwhani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |

(Continued)

FOREIGN PATENT DOCUMENTS

EP    0718954    6/1996

(Continued)

OTHER PUBLICATIONS

Printout of 47 C.F.R. 15 (131 pages).

(Continued)

*Primary Examiner*—Nick Corsaro
*Assistant Examiner*—Huy C Ho
(74) *Attorney, Agent, or Firm*—Troutman Sanders LLP; James H. Yancey, Jr.; Ryan A. Schneider

(57) ABSTRACT

The present invention is generally directed to methods for communicating in a dual-mode communication protocol. A representative embodiment of the present invention comprises: enabling communication in a spread-spectrum communication protocol, comprising: receiving a first portion of a communication frame at a first frequency channel, wherein the first portion of the communication frame comprises a data channel index that indicates a second frequency channel for receiving a second portion of the communication frame; switching to the second frequency channel; and receiving the second portion of the communication frame at the second frequency channel.

35 Claims, 8 Drawing Sheets

U.S. PATENT DOCUMENTS

| | | | |
|---|---|---|---|
| 4,124,839 A | 11/1978 | Cohen | |
| 4,135,181 A | 1/1979 | Bogacki et al. | |
| 4,204,195 A | 5/1980 | Bogacki | |
| 4,213,119 A | 7/1980 | Ward et al. | |
| 4,277,837 A | 7/1981 | Stuckert | |
| 4,278,975 A | 7/1981 | Kimura et al. | |
| 4,354,181 A | 10/1982 | Spletzer | |
| 4,396,910 A | 8/1983 | Enemark et al. | |
| 4,396,915 A | 8/1983 | Farnsworth et al. | |
| 4,417,450 A | 11/1983 | Morgan, Jr. et al. | |
| 4,436,957 A | 3/1984 | Mazza | |
| 4,446,454 A | 5/1984 | Pyle | |
| 4,446,458 A | 5/1984 | Cook | |
| 4,454,414 A | 6/1984 | Benton | |
| 4,468,656 A | 8/1984 | Clifford et al. | |
| 4,488,152 A | 12/1984 | Arnason et al. | |
| 4,495,496 A | 1/1985 | Miller, III | |
| 4,551,719 A | 11/1985 | Carlin et al. | |
| 4,611,198 A | 9/1986 | Levinson et al. | |
| 4,621,263 A | 11/1986 | Takenaka et al. | |
| 4,630,035 A | 12/1986 | Stahl et al. | |
| 4,631,357 A | 12/1986 | Grunig | |
| 4,670,739 A | 6/1987 | Kelly, Jr. | |
| 4,692,761 A | 9/1987 | Robinton | |
| 4,707,852 A | 11/1987 | Jahr et al. | |
| 4,731,810 A | 3/1988 | Watkins | |
| 4,742,296 A | 5/1988 | Petr et al. | |
| 4,788,721 A | 11/1988 | Krishnan et al. | |
| 4,800,543 A | 1/1989 | Lyndon-James et al. | |
| 4,825,457 A | 4/1989 | Lebowitz | |
| 4,829,561 A | 5/1989 | Matheny | |
| 4,849,815 A | 7/1989 | Streck | |
| 4,851,654 A | 7/1989 | Nitta | |
| 4,856,046 A | 8/1989 | Streck et al. | |
| 4,857,912 A | 8/1989 | Everett, Jr. et al. | |
| 4,875,231 A | 10/1989 | Hara et al. | |
| 4,884,132 A | 11/1989 | Morris et al. | |
| 4,897,644 A | 1/1990 | Hirano | |
| 4,906,828 A | 3/1990 | Halpern | |
| 4,908,769 A | 3/1990 | Vaughan et al. | |
| 4,918,690 A | 4/1990 | Markkula, Jr. et al. | |
| 4,918,995 A | 4/1990 | Pearman et al. | |
| 4,928,299 A | 5/1990 | Tansky et al. | |
| 4,939,726 A | 7/1990 | Flammer et al. | |
| 4,940,976 A | 7/1990 | Gastouniotis et al. | |
| 4,949,077 A | 8/1990 | Mbuthia | |
| 4,952,928 A | 8/1990 | Carroll et al. | |
| 4,962,496 A | 10/1990 | Vercellotti et al. | |
| 4,967,366 A | 10/1990 | Kaehler | |
| 4,968,970 A | 11/1990 | LaPorte | |
| 4,968,978 A | 11/1990 | Stolarczyk | |
| 4,972,504 A | 11/1990 | Daniel, Jr. et al. | |
| 4,973,957 A | 11/1990 | Shimizu et al. | |
| 4,973,970 A | 11/1990 | Reeser | |
| 4,977,612 A | 12/1990 | Wilson | 455/166 |
| 4,980,907 A | 12/1990 | Raith et al. | |
| 4,989,230 A | 1/1991 | Gillig et al. | |
| 4,991,008 A | 2/1991 | Nama | |
| 4,998,095 A | 3/1991 | Shields | |
| 4,999,607 A | 3/1991 | Evans | |
| 5,007,052 A | 4/1991 | Flammer | |
| 5,032,833 A | 7/1991 | Laporte | |
| 5,038,372 A | 8/1991 | Elms et al. | |
| 5,055,851 A | 10/1991 | Sheffer | |
| 5,057,814 A | 10/1991 | Onan et al. | |
| 5,061,997 A | 10/1991 | Rea et al. | |
| 5,079,768 A | 1/1992 | Flammer | |
| 5,086,391 A | 2/1992 | Chambers | |
| 5,091,713 A | 2/1992 | Horne et al. | |
| 5,111,199 A | 5/1992 | Tomoda et al. | |
| 5,113,183 A | 5/1992 | Mizuno et al. | |
| 5,113,184 A | 5/1992 | Katayama | |
| 5,115,224 A | 5/1992 | Kostusiak et al. | |
| 5,115,433 A | 5/1992 | Baran et al. | |
| 5,124,624 A | 6/1992 | de Vries et al. | |
| 5,128,855 A | 7/1992 | Hilber et al. | |
| 5,130,519 A | 7/1992 | Bush et al. | |
| 5,130,987 A | 7/1992 | Flammer | |
| 5,131,038 A | 7/1992 | Puhl et al. | |
| 5,134,650 A | 7/1992 | Blackmon | |
| 5,136,285 A | 8/1992 | Okuyama | |
| 5,155,481 A | 10/1992 | Brennan, Jr. et al. | |
| 5,159,317 A | 10/1992 | Brav | |
| 5,162,776 A | 11/1992 | Bushnell et al. | |
| 5,177,342 A | 1/1993 | Adams | |
| 5,189,287 A | 2/1993 | Parienti | |
| 5,191,192 A | 3/1993 | Takahira et al. | |
| 5,191,326 A | 3/1993 | Montgomery | |
| 5,193,111 A | 3/1993 | Matty et al. | |
| 5,195,018 A | 3/1993 | Kwon et al. | |
| 5,197,095 A | 3/1993 | Bonnet et al. | |
| 5,200,735 A | 4/1993 | Hines | |
| 5,204,670 A | 4/1993 | Stinton | |
| 5,212,645 A | 5/1993 | Wildes et al. | |
| 5,216,502 A | 6/1993 | Katz | |
| 5,221,838 A | 6/1993 | Gutman et al. | |
| 5,223,844 A | 6/1993 | Mansell et al. | |
| 5,231,658 A | 7/1993 | Eftechiou | |
| 5,235,630 A | 8/1993 | Moody et al. | |
| 5,239,294 A | 8/1993 | Flanders et al. | |
| 5,239,575 A | 8/1993 | White et al. | |
| 5,241,410 A | 8/1993 | Streck et al. | |
| 5,243,338 A | 9/1993 | Brennan, Jr. et al. | |
| 5,245,633 A | 9/1993 | Schwartz et al. | |
| 5,251,205 A | 10/1993 | Callon et al. | |
| 5,252,967 A | 10/1993 | Brennan et al. | |
| 5,253,167 A | 10/1993 | Yoshida et al. | |
| 5,265,150 A | 11/1993 | Helmkamp et al. | |
| 5,265,162 A | 11/1993 | Bush et al. | |
| 5,266,782 A | 11/1993 | Alanara et al. | |
| 5,272,747 A | 12/1993 | Meads | |
| 5,282,204 A | 1/1994 | Shpancer et al. | |
| 5,282,250 A | 1/1994 | Dent et al. | |
| 5,289,165 A | 2/1994 | Belin | |
| 5,291,516 A * | 3/1994 | Dixon et al. | 375/131 |
| 5,295,154 A | 3/1994 | Meier et al. | |
| 5,305,370 A | 4/1994 | Kearns et al. | |
| 5,309,501 A | 5/1994 | Kozik et al. | |
| 5,315,645 A | 5/1994 | Matheny | |
| 5,317,309 A | 5/1994 | Vercellotti et al. | |
| 5,319,364 A | 6/1994 | Waraksa et al. | |
| 5,319,698 A | 6/1994 | Glidewell et al. | |
| 5,319,711 A | 6/1994 | Servi | |
| 5,323,384 A | 6/1994 | Norwood et al. | |
| 5,325,429 A | 6/1994 | Kurgan | |
| 5,329,394 A | 7/1994 | Calvani et al. | |
| 5,331,318 A | 7/1994 | Montgomery | |
| 5,334,974 A | 8/1994 | Simms et al. | |
| 5,335,265 A | 8/1994 | Cooper et al. | |
| 5,343,493 A | 8/1994 | Karimullah | |
| 5,345,231 A | 9/1994 | Koo et al. | |
| 5,345,595 A | 9/1994 | Johnson et al. | |
| 5,347,263 A | 9/1994 | Carroll et al. | |
| 5,354,974 A | 10/1994 | Eisenberg | |
| 5,355,278 A | 10/1994 | Hosoi et al. | |
| 5,355,513 A | 10/1994 | Clarke et al. | |
| 5,365,217 A | 11/1994 | Toner | |
| 5,371,736 A | 12/1994 | Evan | |
| 5,382,778 A | 1/1995 | Takahira et al. | |
| 5,383,134 A | 1/1995 | Wrzesinski | |
| 5,390,206 A | 2/1995 | Rein | |
| 5,406,619 A | 4/1995 | Akhteruzzman et al. | |
| 5,412,192 A | 5/1995 | Hoss | |
| 5,412,760 A | 5/1995 | Peitz | |

| Patent No. | Date | Inventor(s) |
|---|---|---|
| 5,416,475 A | 5/1995 | Tolbert et al. |
| 5,416,725 A | 5/1995 | Pacheco et al. |
| 5,418,812 A | 5/1995 | Reyes et al. |
| 5,420,910 A | 5/1995 | Rudokas et al. |
| 5,424,708 A | 6/1995 | Ballestry et al. |
| 5,432,507 A | 7/1995 | Mussino et al. |
| 5,438,329 A | 8/1995 | Gastouniotis et al. |
| 5,439,414 A | 8/1995 | Jacob |
| 5,440,545 A | 8/1995 | Buchholz et al. |
| 5,442,553 A | 8/1995 | Parrillo |
| 5,445,287 A | 8/1995 | Center et al. |
| 5,445,347 A | 8/1995 | Ng |
| 5,451,929 A | 9/1995 | Adelman et al. |
| 5,451,938 A | 9/1995 | Brennan, Jr. |
| 5,452,344 A | 9/1995 | Larson |
| 5,454,024 A | 9/1995 | Lebowitz |
| 5,465,401 A | 11/1995 | Thompson |
| 5,467,074 A | 11/1995 | Pedtke |
| 5,467,082 A | 11/1995 | Sanderson |
| 5,467,345 A | 11/1995 | Cutler, Jr. et al. |
| 5,468,948 A | 11/1995 | Koenck et al. |
| 5,471,201 A | 11/1995 | Cerami et al. |
| 5,473,322 A | 12/1995 | Carney |
| 5,475,689 A | 12/1995 | Kay et al. |
| 5,481,259 A | 1/1996 | Bane |
| 5,481,532 A | 1/1996 | Hassan et al. |
| 5,484,997 A | 1/1996 | Haynes |
| 5,488,608 A | 1/1996 | Flammer, III |
| 5,493,273 A | 2/1996 | Smurlo et al. |
| 5,493,287 A | 2/1996 | Bane |
| 5,502,726 A | 3/1996 | Fischer |
| 5,506,837 A | 4/1996 | Sollner et al. |
| 5,509,073 A | 4/1996 | Monnin |
| 5,513,244 A | 4/1996 | Joao et al. |
| 5,515,419 A | 5/1996 | Sheffer |
| 5,517,188 A | 5/1996 | Caroll et al. |
| 5,522,089 A | 5/1996 | Kikinis et al. |
| 5,528,215 A | 6/1996 | Siu et al. |
| 5,539,825 A | 7/1996 | Akiyama et al. |
| 5,541,938 A | 7/1996 | Di Zenzo et al. |
| 5,542,100 A | 7/1996 | Hatakeyama |
| 5,544,036 A | 8/1996 | Brown, Jr. et al. |
| 5,544,784 A | 8/1996 | Malaspina |
| 5,548,632 A | 8/1996 | Walsh et al. |
| 5,550,358 A | 8/1996 | Tait et al. |
| 5,550,359 A | 8/1996 | Bennett |
| 5,550,535 A | 8/1996 | Park |
| 5,553,094 A | 9/1996 | Johnson et al. |
| 5,555,258 A | 9/1996 | Snelling et al. |
| 5,555,286 A | 9/1996 | Tendler |
| 5,562,537 A | 10/1996 | Zver et al. |
| 5,565,857 A | 10/1996 | Lee |
| 5,568,535 A | 10/1996 | Sheffer et al. |
| 5,570,084 A | 10/1996 | Ritter et al. |
| 5,572,438 A | 11/1996 | Ehlers et al. |
| 5,573,181 A | 11/1996 | Ahmed |
| 5,574,111 A | 11/1996 | Brichta et al. |
| 5,583,850 A | 12/1996 | Snodgrass et al. |
| 5,587,705 A | 12/1996 | Morris |
| 5,589,878 A | 12/1996 | Cortjens et al. |
| 5,590,038 A | 12/1996 | Pitroda |
| 5,590,179 A | 12/1996 | Shincovich et al. |
| 5,592,491 A | 1/1997 | Dinks |
| 5,594,431 A | 1/1997 | Sheppard et al. |
| 5,596,719 A | 1/1997 | Ramakrishnan et al. |
| 5,602,843 A | 2/1997 | Gray |
| 5,604,414 A | 2/1997 | Milligan et al. |
| 5,604,869 A | 2/1997 | Mincher et al. |
| 5,606,361 A | 2/1997 | Davidsohn et al. |
| 5,608,786 A | 3/1997 | Gordon |
| 5,613,620 A | 3/1997 | Center et al. |
| 5,615,277 A | 3/1997 | Hoffman |
| 5,619,192 A | 4/1997 | Ayala |
| 5,625,410 A | 4/1997 | Washino et al. |
| 5,628,050 A | 5/1997 | McGraw et al. |
| 5,629,687 A | 5/1997 | Sutton et al. |
| 5,629,875 A | 5/1997 | Adair, Jr. |
| 5,630,209 A | 5/1997 | Wizgall et al. |
| 5,631,554 A | 5/1997 | Briese et al. |
| 5,636,216 A | 6/1997 | Fox et al. |
| 5,640,002 A | 6/1997 | Ruppert et al. |
| 5,644,294 A | 7/1997 | Ness |
| 5,655,219 A | 8/1997 | Jusa et al. |
| 5,657,389 A | 8/1997 | Houvener |
| 5,659,300 A | 8/1997 | Dresselhuys et al. |
| 5,659,303 A | 8/1997 | Adair, Jr. |
| 5,668,876 A | 9/1997 | Falk et al. |
| 5,673,252 A | 9/1997 | Johnson et al. |
| 5,673,304 A | 9/1997 | Connor et al. |
| 5,673,305 A | 9/1997 | Ross |
| 5,682,139 A | 10/1997 | Pradeep et al. |
| 5,682,476 A | 10/1997 | Tapperson et al. |
| 5,689,229 A | 11/1997 | Chaco et al. |
| 5,699,328 A | 12/1997 | Ishizaki et al. |
| 5,701,002 A | 12/1997 | Oishi et al. |
| 5,702,059 A | 12/1997 | Chu et al. |
| 5,704,046 A | 12/1997 | Hogan |
| 5,704,517 A | 1/1998 | Lancaster, Jr. |
| 5,706,191 A | 1/1998 | Bassett et al. |
| 5,706,976 A | 1/1998 | Purkey |
| 5,708,223 A | 1/1998 | Wyss |
| 5,708,655 A | 1/1998 | Toth et al. |
| 5,712,619 A | 1/1998 | Simkin |
| 5,712,980 A | 1/1998 | Beeler et al. |
| 5,714,931 A | 2/1998 | Petite et al. |
| 5,717,718 A | 2/1998 | Roswell et al. |
| 5,726,634 A | 3/1998 | Hess et al. |
| 5,726,984 A | 3/1998 | Kubler et al. |
| 5,732,074 A | 3/1998 | Spaur et al. |
| 5,732,078 A | 3/1998 | Arango |
| 5,736,965 A | 4/1998 | Mosebrook et al. |
| 5,740,232 A | 4/1998 | Pailles et al. |
| 5,742,509 A | 4/1998 | Goldberg et al. |
| 5,745,849 A | 4/1998 | Britton |
| 5,748,104 A | 5/1998 | Argyroudis et al. |
| 5,748,619 A | 5/1998 | Meier |
| 5,754,111 A | 5/1998 | Garcia |
| 5,754,227 A | 5/1998 | Fukuoka |
| 5,754,542 A * | 5/1998 | Ault et al. .................... 370/342 |
| 5,757,783 A | 5/1998 | Eng et al. |
| 5,757,788 A | 5/1998 | Tatsumi et al. |
| 5,761,083 A | 6/1998 | Brown, Jr. et al. |
| 5,764,742 A | 6/1998 | Howard et al. |
| 5,767,791 A * | 6/1998 | Stoop et al. ............ 340/870.11 |
| 5,771,274 A | 6/1998 | Harris |
| 5,774,052 A | 6/1998 | Hamm et al. |
| 4,757,185 A | 7/1998 | Onishi |
| 5,781,143 A | 7/1998 | Rossin |
| 5,790,644 A | 8/1998 | Kikinis |
| 5,790,662 A | 8/1998 | Valerij et al. |
| 5,790,938 A | 8/1998 | Talarmo |
| 5,796,727 A | 8/1998 | Harrison et al. |
| 5,798,964 A | 8/1998 | Shimizu et al. |
| 5,801,643 A | 9/1998 | Williams et al. |
| 5,815,505 A | 9/1998 | Mills |
| 5,818,822 A | 10/1998 | Thomas et al. |
| 5,822,273 A | 10/1998 | Bary et al. |
| 5,822,544 A | 10/1998 | Chaco et al. |
| 5,825,772 A | 10/1998 | Dobbins et al. |
| 5,826,195 A | 10/1998 | Westerlage et al. |
| 5,828,044 A | 10/1998 | Jun et al. |
| 5,832,057 A | 11/1998 | Furman |
| 5,838,223 A | 11/1998 | Gallant et al. |
| 5,838,237 A | 11/1998 | Revell et al. |
| 5,838,812 A | 11/1998 | Pare, Jr. et al. |
| 5,841,118 A | 11/1998 | East et al. |

| | | | | | | |
|---|---|---|---|---|---|---|
| 5,841,764 A | 11/1998 | Roderique et al. | | 6,036,086 A | 3/2000 | Sizer, II et al. |
| 5,842,976 A | 12/1998 | Williamson | | 6,038,491 A | 3/2000 | McGarry et al. |
| 5,844,808 A | 12/1998 | Konsmo et al. | | 6,044,062 A | 3/2000 | Brownrigg et al. |
| 5,845,230 A | 12/1998 | Lamberson | | 6,054,920 A | 4/2000 | Smith et al. |
| 5,852,658 A | 12/1998 | Knight et al. | | 6,060,994 A | 5/2000 | Chen |
| 5,854,994 A | 12/1998 | Canada et al. | | 6,061,604 A | 5/2000 | Russ et al. |
| 5,862,201 A | 1/1999 | Sands | | 6,064,318 A | 5/2000 | Kirchner, III et al. |
| 5,864,772 A | 1/1999 | Alvarado et al. | | 6,067,017 A | 5/2000 | Stewart et al. |
| 5,873,043 A | 2/1999 | Comer | | 6,067,030 A | 5/2000 | Burnett et al. |
| 5,874,903 A | 2/1999 | Shuey et al. | | 6,069,886 A | 5/2000 | Ayerst et al. |
| 5,880,677 A | 3/1999 | Lestician | | 6,073,169 A | 6/2000 | Shuey et al. |
| 5,884,184 A | 3/1999 | Sheffer | | 6,073,266 A | 6/2000 | Ahmed et al. |
| 5,884,271 A | 3/1999 | Pitroda | | 6,073,840 A | 6/2000 | Marion |
| 5,886,333 A | 3/1999 | Miyake | | 6,075,451 A | 6/2000 | Lebowitz et al. |
| 5,889,468 A | 3/1999 | Banga | | 6,078,251 A | 6/2000 | Landt et al. |
| 5,892,690 A | 4/1999 | Boatman et al. | | 6,087,957 A | 7/2000 | Gray |
| 5,892,758 A | 4/1999 | Argyroudis | | 6,088,659 A | 7/2000 | Kelley et al. |
| 5,892,924 A | 4/1999 | Lyon et al. | | 6,094,622 A | 7/2000 | Hubbard et al. |
| 5,896,097 A | 4/1999 | Cardozo | | 6,100,817 A | 8/2000 | Mason, Jr. et al. |
| 5,897,607 A | 4/1999 | Jenney et al. | | 6,101,427 A | 8/2000 | Yang |
| 5,898,369 A | 4/1999 | Godwin | | 6,101,445 A | 8/2000 | Alvarado et al. |
| 5,905,438 A | 5/1999 | Weiss et al. | | 6,112,983 A | 9/2000 | D'Anniballe et al. |
| 5,907,291 A | 5/1999 | Chen et al. | | 6,115,580 A | 9/2000 | Chuprun et al. |
| 5,907,491 A | 5/1999 | Canada et al. | | 6,119,076 A | 9/2000 | Williams et al. |
| 5,907,540 A | 5/1999 | Hayashi | | 6,121,593 A | 9/2000 | Mansbery et al. |
| 5,907,807 A | 5/1999 | Chavez, Jr. et al. | | 6,121,885 A | 9/2000 | Masone et al. |
| 5,914,672 A | 6/1999 | Glorioso et al. | | 6,124,806 A | 9/2000 | Cunningham et al. |
| 5,914,673 A | 6/1999 | Jennings et al. | | 6,127,917 A | 10/2000 | Tuttle |
| 5,917,405 A | 6/1999 | Joao | | 6,128,551 A | 10/2000 | Davis et al. |
| 5,917,629 A | 6/1999 | Hortensius et al. | | 6,130,622 A | 10/2000 | Hussey et al. |
| 5,923,269 A | 7/1999 | Shuey et al. | | 6,133,850 A | 10/2000 | Moore |
| 5,926,103 A | 7/1999 | Petite | | 6,137,423 A | 10/2000 | Glorioso et al. |
| 5,926,529 A | 7/1999 | Hache et al. | | 6,140,975 A | 10/2000 | Cohen |
| 5,926,531 A | 7/1999 | Petite | | 6,141,347 A | 10/2000 | Shaughnessy et al. |
| 5,933,073 A | 8/1999 | Shuey | | 6,150,936 A | 11/2000 | Addy |
| 5,941,363 A | 8/1999 | Partyka et al. | | 6,150,955 A | 11/2000 | Tracy et al. |
| 5,941,955 A | 8/1999 | Wilby et al. | | 6,157,464 A | 12/2000 | Bloomfield et al. |
| 5,948,040 A | 9/1999 | DeLorme et al. | | 6,157,824 A | 12/2000 | Bailey |
| 5,949,779 A | 9/1999 | Mostafa et al. | | 6,163,276 A | 12/2000 | Irving et al. |
| 5,949,799 A | 9/1999 | Grivna et al. | | 6,172,616 B1 | 1/2001 | Johnson et al. |
| 5,953,319 A | 9/1999 | Dutta et al. | | 6,174,205 B1 | 1/2001 | Madsen et al. |
| 5,953,371 A | 9/1999 | Roswell et al. | | 6,175,922 B1 | 1/2001 | Wang |
| 5,955,718 A | 9/1999 | Levasseur et al. | | 6,177,883 B1 | 1/2001 | Jennetti et al. |
| 5,960,074 A | 9/1999 | Clark | | 6,181,255 B1 | 1/2001 | Crimmins et al. ...... 340/825.69 |
| 5,963,146 A | 10/1999 | Johnson et al. | | 6,181,284 B1 | 1/2001 | Madsen et al. |
| 5,963,452 A | 10/1999 | Etoh et al. | | 6,181,981 B1 | 1/2001 | Varga et al. |
| 5,963,650 A | 10/1999 | Simionescu et al. | | 6,188,354 B1 | 2/2001 | Soliman et al. |
| 5,966,658 A | 10/1999 | Kennedy, III et al. | | 6,192,390 B1 | 2/2001 | Berger et al. |
| 5,969,608 A | 10/1999 | Sojdehei et al. | | 6,198,390 B1 | 3/2001 | Schlager et al. |
| 5,973,756 A | 10/1999 | Erlin | | 6,199,068 B1 | 3/2001 | Carpenter |
| 5,974,236 A | 10/1999 | Sherman | | 6,208,266 B1 | 3/2001 | Lyons et al. |
| 5,978,364 A | 11/1999 | Melnik | | 6,215,404 B1 | 4/2001 | Morales |
| 5,978,371 A | 11/1999 | Mason, Jr. et al. | | 6,218,953 B1 | 4/2001 | Petite |
| 5,986,574 A | 11/1999 | Colton | | 6,218,958 B1 | 4/2001 | Eichstaedt |
| 5,987,421 A | 11/1999 | Chuang | | 6,218,983 B1 | 4/2001 | Kerry et al. |
| 5,991,625 A | 11/1999 | Vanderpool | | 6,219,409 B1 | 4/2001 | Smith et al. |
| 5,991,639 A | 11/1999 | Rautiola et al. | | 6,229,439 B1 | 5/2001 | Tice |
| 5,994,892 A | 11/1999 | Turino et al. | | 6,233,327 B1 | 5/2001 | Petite |
| 5,995,592 A | 11/1999 | Shirai et al. | | 6,234,111 B1 | 5/2001 | Ulman et al. |
| 5,995,593 A | 11/1999 | Cho | | 6,236,332 B1 | 5/2001 | Conkright et al. |
| 5,997,170 A | 12/1999 | Brodbeck | | 6,243,010 B1 | 6/2001 | Addy et al. |
| 5,999,094 A | 12/1999 | Nilssen | | 6,246,677 B1 | 6/2001 | Nap et al. |
| 6,005,759 A | 12/1999 | Hart et al. | | 6,246,886 B1 * | 6/2001 | Oliva ...................... 455/426.1 |
| 6,005,963 A | 12/1999 | Bolle et al. | | 6,249,516 B1 | 6/2001 | Brownrigg et al. |
| 6,021,664 A | 2/2000 | Granato et al. | | 6,259,369 B1 | 7/2001 | Monico |
| 6,023,223 A | 2/2000 | Baxter, Jr. | | 6,275,707 B1 | 8/2001 | Reed et al. |
| 6,026,095 A | 2/2000 | Sherer et al. | | 6,286,756 B1 | 9/2001 | Stinson et al. |
| 6,028,522 A | 2/2000 | Petite | | 6,288,634 B1 | 9/2001 | Weiss et al. |
| 6,028,857 A | 2/2000 | Poor | | 6,288,641 B1 | 9/2001 | Casais |
| 6,031,455 A | 2/2000 | Grube et al. | | 6,295,291 B1 | 9/2001 | Larkins |
| 6,032,197 A | 2/2000 | Birdwell et al. | | 6,301,514 B1 | 10/2001 | Canada et al. |
| 6,035,213 A * | 3/2000 | Tokuda et al. ............. 455/553.1 | | 6,304,556 B1 | 10/2001 | Haas |
| 6,035,266 A | 3/2000 | Williams et al. | | 6,305,602 B1 | 10/2001 | Grabowski et al. |

| | | | | | | |
|---|---|---|---|---|---|---|
| 6,308,111 B1 | 10/2001 | Koga | | 6,771,981 B1 | 8/2004 | Zalewski et al. |
| 6,311,167 B1 | 10/2001 | Davis et al. | | 6,804,532 B1 | 10/2004 | Moon et al. |
| 6,314,169 B1 | 11/2001 | Schelberg, Jr. et al. | | 6,816,088 B1 | 11/2004 | Knoska et al. |
| 6,317,029 B1 | 11/2001 | Fleeter | | 6,888,876 B1 * | 5/2005 | Mason et al. ............... 375/132 |
| 6,334,117 B1 | 12/2001 | Covert et al. | | 6,891,838 B1 | 5/2005 | Petite |
| 6,351,223 B1 | 2/2002 | DeWeerd et al. | | 6,914,533 B2 | 7/2005 | Petite |
| 6,356,205 B1 | 3/2002 | Salvo et al. | | 6,914,893 B2 | 7/2005 | Petite |
| 6,357,034 B1 | 3/2002 | Muller et al. | | 6,959,550 B2 | 11/2005 | Freeman et al. |
| 6,362,745 B1 | 3/2002 | Davis | | 7,027,416 B1 | 4/2006 | Kriz |
| 6,363,057 B1 | 3/2002 | Ardalan et al. | | 7,054,271 B2 | 5/2006 | Brownrigg et al. |
| 6,366,217 B1 | 4/2002 | Cunningham et al. | | 2001/0002210 A1 | 5/2001 | Petite |
| 6,366,622 B1 | 4/2002 | Brown et al. | | 2001/0003479 A1 | 6/2001 | Fujiwara ..................... 353/122 |
| 6,369,769 B1 | 4/2002 | Nap et al. | | 2001/0021646 A1 | 9/2001 | Antonucci et al. |
| 6,370,489 B1 | 4/2002 | Williams et al. | | 2001/0024163 A1 | 9/2001 | Petite |
| 6,373,399 B1 | 4/2002 | Johnson et al. | | 2001/0034223 A1 | 10/2001 | Rieser et al. |
| 6,380,851 B1 | 4/2002 | Gilbert et al. | | 2001/0038343 A1 | 11/2001 | Meyer et al. |
| 6,384,722 B1 | 5/2002 | Williams | | 2002/0002444 A1 | 1/2002 | Williams et al. |
| 6,389,059 B1 * | 5/2002 | Smith et al. ............... 375/141 | | 2002/0012323 A1 | 1/2002 | Petite et al. |
| 6,393,341 B1 | 5/2002 | Lawrence et al. | | 2002/0013679 A1 | 1/2002 | Petite |
| 6,393,381 B1 | 5/2002 | Williams et al. | | 2002/0019725 A1 | 2/2002 | Petite |
| 6,393,382 B1 | 5/2002 | Williams et al. | | 2002/0027504 A1 | 3/2002 | Davis et al. |
| 6,396,839 B1 | 5/2002 | Ardalan et al. | | 2002/0031101 A1 | 3/2002 | Petite |
| 6,400,819 B1 | 6/2002 | Nakano et al. | | 2002/0032746 A1 | 3/2002 | Lazaridis .................... 709/217 |
| 6,401,081 B1 | 6/2002 | Montgomery et al. | | 2002/0061031 A1 * | 5/2002 | Sugar et al. ................. 370/466 |
| 6,405,018 B1 | 6/2002 | Reudink et al. | | 2002/0072348 A1 | 6/2002 | Wheeler et al. |
| 6,411,889 B1 | 6/2002 | Mizunuma et al. | | 2002/0089428 A1 | 7/2002 | Walden et al. |
| 6,415,245 B2 | 7/2002 | Williams et al. | | 2002/0095399 A1 | 7/2002 | Devine et al. .................. 707/1 |
| 6,421,354 B1 | 7/2002 | Godlewski | | 2002/0098858 A1 | 7/2002 | Struhsaker |
| 6,421,731 B1 | 7/2002 | Ciotti, Jr. et al. | | 2002/0109607 A1 | 8/2002 | Cumeralto et al. ...... 340/870.02 |
| 6,422,464 B1 | 7/2002 | Terranova | | 2002/0136233 A1 * | 9/2002 | Chen et al. .................. 370/445 |
| 6,424,270 B1 | 7/2002 | Ali | | 2002/0158774 A1 | 10/2002 | Johnson et al. |
| 6,424,931 B1 | 7/2002 | Sigmar et al. | | 2002/0163442 A1 | 11/2002 | Fischer |
| 6,430,268 B1 | 8/2002 | Petite | | 2002/0169643 A1 | 11/2002 | Petite |
| 6,431,439 B1 | 8/2002 | Suer et al. | | 2002/0193144 A1 | 12/2002 | Belski et al. |
| 6,437,692 B1 | 8/2002 | Petite et al. ................. 340/540 | | 2003/0001754 A1 | 1/2003 | Johnson et al. |
| 6,438,575 B1 | 8/2002 | Khan et al. ................. 709/200 | | 2003/0023146 A1 | 1/2003 | Shusterman, D.O. |
| 6,445,291 B2 | 9/2002 | Addy et al. | | 2003/0028632 A1 | 2/2003 | Davis |
| 6,456,960 B1 | 9/2002 | Williams et al. | | 2003/0030926 A1 | 2/2003 | Aguren et al. |
| 6,457,038 B1 | 9/2002 | Defosse | | 2003/0034900 A1 | 2/2003 | Han |
| 6,462,644 B1 | 10/2002 | Howell et al. | | 2003/0035438 A1 | 2/2003 | Larsson |
| 6,462,672 B1 | 10/2002 | Besson | | 2003/0036822 A1 | 2/2003 | Davis et al. |
| 6,477,558 B1 | 11/2002 | Irving et al. | | 2003/0046377 A1 | 3/2003 | Daum et al. |
| 6,483,290 B1 | 11/2002 | Hemminger et al. | | 2003/0058818 A1 | 3/2003 | Wilkes et al. ............... 370/331 |
| 6,484,939 B1 | 11/2002 | Blaeuer | | 2003/0069002 A1 | 4/2003 | Hunter et al. |
| 6,489,884 B1 | 12/2002 | Lamberson et al. | | 2003/0073406 A1 | 4/2003 | Benjamin et al. |
| 6,491,828 B1 | 12/2002 | Sivavec et al. | | 2003/0078029 A1 | 4/2003 | Petite |
| 6,492,910 B1 | 12/2002 | Ragle et al. | | 2003/0093484 A1 | 5/2003 | Petite |
| 6,504,357 B1 | 1/2003 | Hemminger et al. | | 2003/0133473 A1 | 7/2003 | Manis et al. |
| 6,507,794 B1 | 1/2003 | Hubbard et al. | | 2003/0169710 A1 | 9/2003 | Fan et al. .................... 370/338 |
| 6,509,722 B2 | 1/2003 | Lopata ........................ 323/280 | | 2003/0185204 A1 | 10/2003 | Murdock |
| 6,519,568 B1 | 2/2003 | Harvey et al. | | 2003/0210638 A1 | 11/2003 | Yoo et al. ................ 369/112.08 |
| 6,538,577 B1 | 3/2003 | Ehrke et al. | | 2004/0047324 A1 * | 3/2004 | Diener ........................ 370/338 |
| 6,542,076 B1 | 4/2003 | Joao | | 2004/0053639 A1 | 3/2004 | Petite |
| 6,542,077 B2 | 4/2003 | Joao | | 2004/0131125 A1 | 7/2004 | Sanderford, Jr. et al. |
| 6,543,690 B2 | 4/2003 | Leydier et al. | | 2004/0133917 A1 * | 7/2004 | Schilling ....................... 725/95 |
| 6,560,223 B1 | 5/2003 | Egan et al. | | 2004/0183687 A1 | 9/2004 | Petite |
| 6,574,603 B1 | 6/2003 | Dickson et al. | | 2004/0228330 A1 * | 11/2004 | Kubler et al. ................ 370/352 |
| 6,584,080 B1 | 6/2003 | Ganz et al. | | 2005/0190055 A1 | 9/2005 | Petite |
| 6,600,726 B1 | 7/2003 | Nevo et al. .................. 370/278 | | 2005/0195768 A1 | 9/2005 | Petite |
| 6,608,551 B1 | 8/2003 | Anderson et al. ......... 340/10.51 | | 2005/0195775 A1 | 9/2005 | Petite |
| 6,618,578 B1 | 9/2003 | Petite | | 2005/0201397 A1 | 9/2005 | Petite |
| 6,618,709 B1 | 9/2003 | Sneeringer | | 2005/0243867 A1 | 11/2005 | Petite |
| 6,628,764 B1 | 9/2003 | Petite | | 2006/0098576 A1 | 5/2006 | Brownrigg et al. |
| 6,628,965 B1 | 9/2003 | LaRosa et al. .............. 455/557 | | 2008/0186898 A1 | 8/2008 | Petite |
| 6,653,945 B2 | 11/2003 | Johnson et al. | | 2009/0006617 A1 | 1/2009 | Petite |
| 6,654,357 B1 | 11/2003 | Wiedeman | | 2009/0068947 A1 | 3/2009 | Petite |
| 6,671,586 B2 | 12/2003 | Davis et al. | | | | |
| 6,674,403 B2 | 1/2004 | Gray et al. .................. 342/463 | | FOREIGN PATENT DOCUMENTS | | |
| 6,678,255 B1 | 1/2004 | Kuriyan | | | | |
| 6,678,285 B1 | 1/2004 | Garg | | EP | 07144 | 2/1998 |
| 6,731,201 B1 | 5/2004 | Bailey et al. | | EP | 1096454 | 5/2001 |
| 6,735,630 B1 | 5/2004 | Gelvin et al. | | FR | 2817110 | 5/2002 |
| 6,747,557 B1 | 6/2004 | Petite et al. | | GB | 2229302 | 9/1990 |

| | | |
|---|---|---|
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 | 4/2001 |
| WO | WO 90/13197 | 11/1990 |
| WO | 9534177 | 9/1995 |
| WO | WO 98/00056 | 1/1998 |
| WO | WO98/10393 A1 | 3/1998 |
| WO | WO 98/37528 | 8/1998 |
| WO | WO 99/13426 | 3/1999 |
| WO | 0023956 | 4/2000 |
| WO | WO00/36812 A1 | 6/2000 |
| WO | WO 01/15114 | 8/2000 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO02/052521 | 7/2002 |
| WO | WO 03/007264 | 1/2003 |
| WO | WO03/007264 | 1/2003 |
| WO | 03/021877 | 3/2003 |
| WO | WO 03/021877 | 3/2003 |
| WO | 04002014 | 12/2003 |

OTHER PUBLICATIONS

Federal Communications Commission, "Notice of Proposed Rule Making and Order," Adopted Dec. 17, 2003, Released Dec. 30, 2003 (53 pages).
Xecom Incorporated, "XE900S Smart Spread Spectrum Transceiver," Nov. 2003 (13 pages).
Harrington, Tim, "More Visible Vehicles," ActionLINE, Jul. 2003 (4 pages).
Khan, Robert E., "The Organization of Computer Resources into a Packet Radio Network," IEEE Transactions on Communications, Jan. 1977, vol. Com-25 No. 1, pp. 169-178.
Westcott, Jill A., "Issues in Distributed Routing for Mobile Packet Radio Network," IEEE 1982, pp. 233-238.
Westcott, Jil et al., "A Distributed Routing Design for a Broadcoast Environment", IEEE 1982, pp. 10.4.0-10.4.5.
Khan, Robert E. et al., "Advances in Packet Radio Technology", IEEE Nov. 1978, vol. 66, No. 11, pp. 1468-1496.
Frankel, Michael S., "Packet Radios Provide Link for Distributed, Survivable C3 in Post-Attack Scenarios", MSN Jun. 1983.
Lauer, Greg et al., "Survivable Protocols for Large Scale Packet Radio Networks", IEEE 1984, pp. 15.1-1 to 15.1-4.
Gower, Neil et al., "Congestion Control Using Pacing in a Packet Radio Network", IEEE 1982, pp. 23.1-1 to 23.1-6.
MacGregor, William et al., "Multiple Control Stations in Packet Radio Networks", IEEE 1982, pp. 10.3-1 to 10.3-5.
Shacham, Nachum et al., "Future Directions in Packet Radio Technology", IEEE 1985, pp. 93-98.
Jubin, John, "Current Packet Radio Network Protocols", IEEE 1985, pp. 86-92.

Westcott, Jill A., Issues in Distributed Routing for Mobile Packet Radio Network, IEEE 1982, pp. 233 238.
Lynch, Clifford A. et al., Packet Radio Networks, "Architectures, Protocols, Technologies and Applications."
Brownrigg, Edwin, "User Provided Access to the Internet,", Open Access Solutions, http://web.simmons.edu/chen/nit/NIT'92/033-bro.htm, Jun. 8, 2005-Jun. 9, 2005.
Khan, Robert E., "The Organization of Computer Resources into a Packet Radio Network," IEEE, Jan. 1977, vol. Com-25 No. 1, pp. 169-178.
Brownrigg, E.B. et al.; A Packet Radio Network for Library Automation; IEEE (1987); pp. 456-462.
Brownrigg, E.B. et al.; A Packet Radio Networks; Architectures, Protocols, Technologies and Applications (1987), (introduction pp. ix-xviii); pp. 3-274.
Brownrigg, E.B. et al.; Distributions, Networks, and Networking: Options for Dissemination; Workshop on Electronic Texts Session III (http://palimpsest.stanford.edu/byorg/lc/etextw/sess3.html 1992): pp. 1-10.
Brownrigg, E.B. et al.; User Provided Access to the Internet; (http://web.simmons.edu/~chen/nit/NIT'92/033-bro.htm 2005) pp. 1-6.
Wey, Jyhi-Kong et al.; Clone Terminator: An Authentication Service for Advanced Mobile Phone System; IEEE (1995); pp. 175-179.
Davis, A.B. et al.; Knowledge-Based Management of Cellular Clone Fraud; IEEE (1992); pp. 230-234.
Johnson, David B.; Routing in Ad Hoc Networks of Mobile Hosts; IEEE (1995); pp. 158-163.
Jubin, John and Tornow, Janet D., "The Darpa Packet Radio Network Protocols,"Proceedings of the IEEE, vol. 75, No. 1, Jan. 1987, pp. 21-32.
Kleinrock, Leonard and Kamoun, Farouk, "Hierarchical Routing for Large Networks," North-Holland Publishing Company, Computer Networks 1, 1997, pp. 155-174.
Perkins, C.E. et al.; Highly Dynamic Destination-Sequenced Distance-Vector Routing (DSDV) for Mobile Computers; SIGCOMM 94-9/94 London England UK (1994); pp. 234-244.
Wu, J.; Distributed System Design; CRC Press (1999); pp. 177-180 and 204.
Khan, Robert E., Gronemeyer, Steven A. Burchfiel, Jerry, and Kunzelman, Ronald C., "Advances in Packet Radio Technology" IEEE Nov. 1978, vol. 66, No. 11, pp. 1468-149.
Babak Daneshrad, et al.; 1997 Project Summary "Mobile Versatile Radios (MoVeR);" University of California, Los Angeles; pp. 1-4.
Rajeev Jain, et al.; 1997 Project Summary "Held Untethered Nodes;" University of California, Los Angeles; pp. 1-5.
Randy H. Katz and Eric A. Brewer; 1997 Project Summary "Towards a Wireless Overlay Internetworking Architecture;" University of California, Berkeley; pp. 1-8, including slide show presentation at http://daedalus.cs.berkeley,edu/talks/retreat.6.96/Overview.pdf.
J.J. Garcia-Luna-Aceves, et al.; "Wireless Internet Gateways (Wings);" IEEE, 1997; pp. 1271-1276.
Randy H. Katz, et al.; "The Bay Area Research Wireless Access Network (BARWAN);" Electrical Engeneering and Computer Science Department, University of California, Berkeley, CA; IEEE, 1996; pp. 15-20, including slide show presentation at http://daedalus.cs.berkeley.eduitalks/retreat.6.97/BARWAN.S97.ppt.
USPTO's Decision dated Nov. 28, 2008 Denying Ex Pane Reexamination of USPN 7,103,511 in Reexamination Control No. 90/010,315.
USPTO's Decision dated Jun. 22, 2009 Granting Ex Parte Reexamination of USPN 7,103,511 in Reexamination Control No. 90/010,509.
USPTO's Decision dated Jun. 22, 2009 Granting Ex Parte Reexamination of USPN 7,103,511 in Reexamination Control No. 90/010,505.
USPTO's Decision dated Jun. 22, 2009 Granting Ex Parte Reexamination of USPN 7,103,511 in Reexamination Control No. 90/010,507.
USPTO's Decision dated Jun. 22, 2009 Granting Ex Parte Reexamination of USPN 7,103,511 in Reexamination Control No. 90/010,508.

USPTO's Decision dated Jul. 21, 2009 Granting Ex Parte Reexamination of USPN 6,891,838 in Reexamination Control No. 90/010,512.

USPTO's Decision dated Jul. 21, 2009 Granting Ex Parte Reexamination of USPN 6,891,838 in Reexamination Control No. 90/010,510.

USPTO's Decision dated Jul. 21, 2009 Granting Ex Parte Reexamination of USPN 6,891,838 in Reexamination Control No. 90/010,511.

USPTO's Decision dated Nov. 13, 2008 Granting Ex Parte Reexamination of USPN 6,891,838 in Reexamination Control No. 90/010,301.

K. Bult, et al.; "Low Power Systems for Wireless Microsensors;" UCLA Electrical Engineering Department, Los Angeles, CA and Rockwell Science Center, Thousand Oaks, CA; pp. 25-29.

David B. Johnnson and David A. Maltz, Dynamic Source Routing in Ad Hoc Wireless Networks; Computer Science Department, Carnegie Mellon University; a Chapter in Mobile Computing; Feb. 29, 1996; pp. 1-18.

David A. Maltz et al.; Experiences Designing and Building a Multi-Hop Wireless Ad Hoc Network Testbed; School of Computer Science, Carnegie Mellon University; Mar. 5, 1999; pp. 1-20.

"Part 11: Wireless Lan Medium Access Control (MAC) and Physical Layer (PHY) Specifications;" IEEE Std 802.Nov. 1997; published Jun. 26, 1997 by the IEEE; pp. 1-459.

John Jubin and Janet D. Tornow; "The DARPA Packet Radio Network Protocols;" Proceedings of the IEEE; vol. 75, No. 1, Jan. 1987; pp. 64-79.

Chane Lee Fullmer; "Collision Avoidance Techniques for Packet-Radio Networks" thesis; University of California at Santa Cruz, CA; Jun. 1998; pp. 1-172.

* cited by examiner

METHOD FOR COMMUNICATING IN DUAL-MODES

BACKGROUND SECTION

Prior art monitoring and controlling systems for various applications, such as automated meter reading, prognostics, vending machines, and fire alarm and sprinkler systems utilize various communication protocols. Generally, these protocols utilize wireless RF communications either between transceivers or between a plurality of transceivers and a remote interrogator. The remote interrogator may then be coupled to a wide area network (WAN) which enables access to the transceivers by backend servers, workstations, etc.

In some instances, the RF transceivers may utilize a single-channel, substantially low-power communications protocol and, thus, have a limited range. The low-power applications are advantageous in certain remote applications, where a constant power supply is not available. For example, a transceiver coupled to a water meter cannot tap into any local power at the water meter, because typically there is no power. In this case, a battery is typically used. In order to maximize the life span of the battery, low-power transmissions are used. Low-power transmissions may also be advantageous because at certain frequency bands, a license from the Federal Communication Commission (FCC) is not required. The FCC requires certain devices to be licensed and/or comply with certain provisions if the devices radiate enough power within a given frequency spectrum over a given period.

Unfortunately, there are drawbacks to a low-power, single-channel communication protocol. In particular, the range of communication is directly proportional to the level of radiated power. Therefore, low power implies shorter communication range. Shorter communication range generally requires more infrastructure in a wireless system. Furthermore, single-channel communications (e.g., communications within one frequency channel, or on one carrier frequency) can be a problem if there is other electromagnetic radiation in a given area. Interference from other devices may cause noise at or near the specific single channel in which the RF transceivers are attempting to communicate, thus making communication unreliable, if not unfeasible.

Considering these drawbacks, it would be desirable to have a communication protocol that overcomes the disadvantages illustrated above. Furthermore, it would be advantageous for a systems provider for the communication devices (i.e., the RF transceivers and gateways) to be compatible with both communications protocols so that a communication upgrade would not require existing devices to be replaced. Instead, the existing devices could be upgraded remotely through the system.

SUMMARY

Various embodiments of a dual-mode communication protocol, and corresponding systems, devices, methods, and computer programs, are provided. One embodiment is a method of communicating with a dual-mode communication protocol in a given frequency band composed of a plurality of channels. A first set of the plurality of channels is designated fixed-frequency channels and a second set of the plurality of channels is designated spread-spectrum channels. The spread-spectrum channels comprise a first subset of acquisition channels and a second subset of data channels. One such method comprises: enabling communication in a spread-spectrum communication mode; attempting to receive a communication packet by traversing through the subset of acquisition channels; upon receiving a communication packet, switching to a data channel designated by the communication packet; and receiving and verifying a data portion of the communication packet by communicating in the designated data channel. Upon not receiving a communication packet after traversing through the subset of acquisition channels, the method continues with: enabling communication in a fixed-frequency communication mode; attempting to receive a communication packet by traversing through the designated fixed-frequency channels; and, upon receiving a communication packet, receiving and verifying a data portion of the communication packet by maintaining communication in the current fixed-frequency channel.

Another embodiment is a method for communicating in a dual-mode communication protocol. The method comprises: enabling communication in a spread-spectrum communication protocol, comprising: receiving a first portion of a communication frame at a first frequency channel, the first portion of the communication frame comprising a data channel index that indicates a second frequency channel for receiving a second portion of the communication frame; switching to the second frequency channel; and receiving the second portion of the communication frame at the second frequency channel.

Yet another embodiment is a method for communicating data. The method comprises: enabling communication in a spread-spectrum communication protocol, the spread spectrum communication protocol, comprising: transmitting a first portion of a communication frame at a first frequency channel, the first portion of the communication frame comprising a data channel index that indicates a second frequency channel for communicating a second portion of the communication frame; switching to the second frequency channel; and transmitting the second portion of the communication frame at the second frequency channel.

BRIEF DESCRIPTION OF THE DRAWINGS

The accompanying drawings incorporated in and forming a part of the specification, illustrate several aspects of the present invention, and together with the description serve to explain the principles of the invention.

DETAILED DESCRIPTION

Embodiments illustrated in further detail below illustrate various systems, methods, devices, and programs for communicating in a dual-mode communication protocol. A first communication protocol may generally be considered a fixed-frequency communication protocol and a second communication protocol may generally be considered a spread-spectrum communication protocol.

An embodiment of a transceiver communicating in a fixed-frequency communication protocol is generally configured to communicate a communication packet at a single frequency channel, with a first modulation scheme, at a given radiating power level.

An embodiment of a transceiver communicating in a spread-spectrum communication protocol is generally configured to communicate a first portion of a communication packet at a first frequency channel, and then communicate a second portion of the communication packet at a second frequency channel. The spread-spectrum communication protocol may employ a second modulation scheme, at a given radiating power level.

An embodiment of a transceiver communicating in the dual-mode communication protocol can generally communicate in both communication protocols. By providing for both communication protocols, the disadvantages of utilizing one singular protocol may be avoided. The accompanied figures and description illustrate embodiments of the dual-mode communication protocol in further detail.

Figure 1:
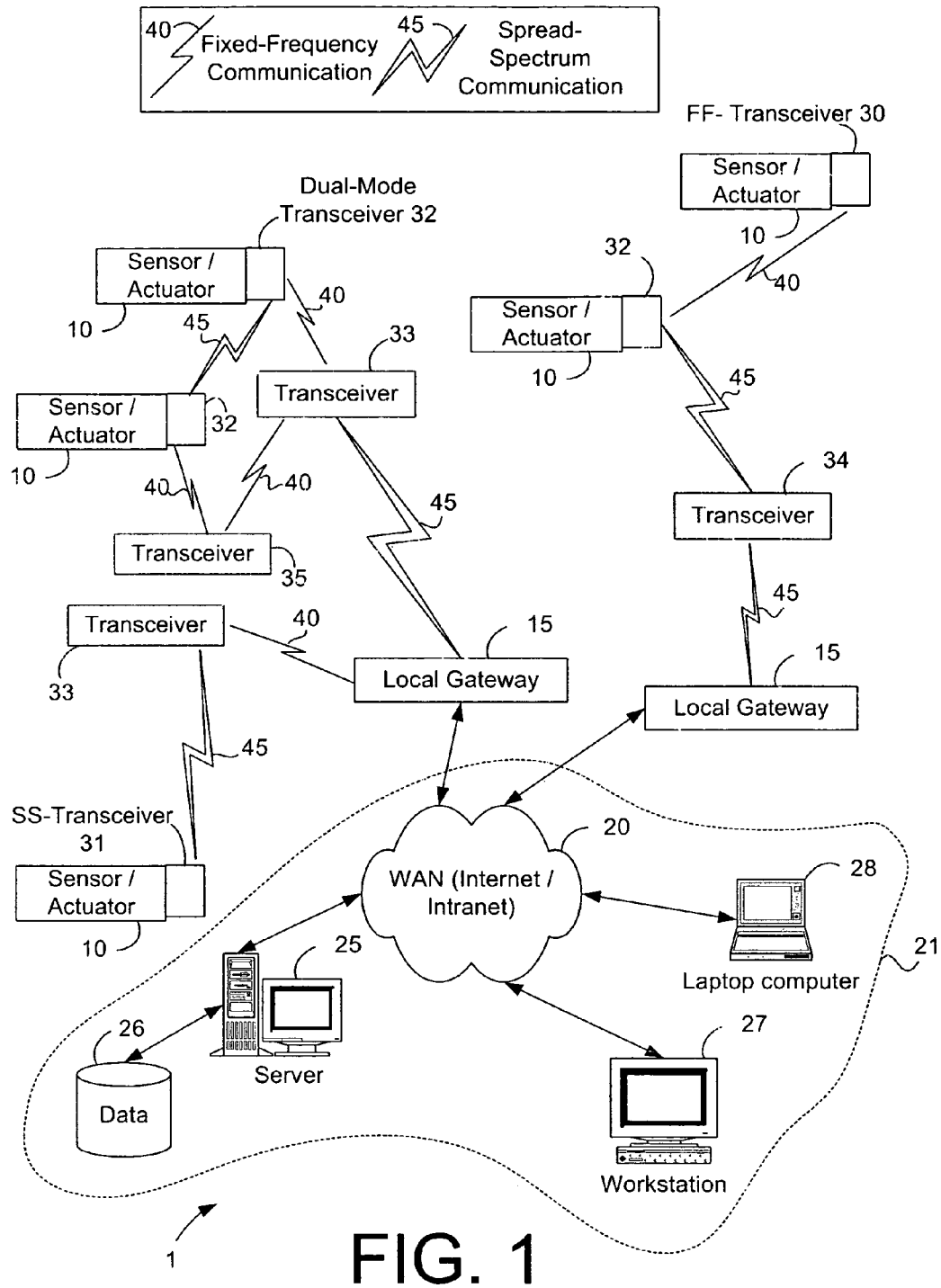
FIG. 1 is a block diagram illustrating an embodiment of a dual-mode monitoring/control system.

Turning now to FIG. 1, illustrated is a block diagram of an embodiment of a dual-mode monitoring/control system 1. Dual-mode system 1 comprises one or more external devices to be monitored and/or controlled (e.g., sensor/actuators 10) as illustrated in FIG. 1. Each sensor/actuator may be integrated with a transceiver 30, 31, or 32. The transceivers 30-32 are preferably RF (radio frequency) transceivers that are relatively small in size. Depending on the communication mode utilized, the transceivers 30-32 transmit either a relatively low-power RF signal, or a higher-power RF signal. As a result, in some applications, the transmission range of a given transceiver may be relatively limited. Although the transceivers 30-32 are depicted without a user interface such as a keypad, in certain embodiments, the transceivers 30-32 may be configured with user selectable buttons or an alphanumeric keypad. The transceivers 30-32 may be electrically interfaced with the device to be monitored and/or controlled, such as a smoke detector, a thermostat, a security system, etc., where external buttons are not needed.

Dual-mode system 1 also includes a plurality of stand-alone transceivers 33-35, which may be fixed or mobile. Each stand-alone transceiver 33-35 and each of the integrated transceivers 30-32 may be configured to receive an incoming RF transmission (transmitted by a remote transceiver) and to transmit an outgoing signal. The transceivers depicted in FIG. 1 may include different functionality depending on whether the transceiver communicates in a fixed-frequency communication mode, a spread-spectrum communication mode, or both. These communication modes, or protocols, will be discussed in further detail in subsequent figures. All transceivers may include the hardware and/or software to communicate in either of the protocols, but may be programmed or configured to communicate in only one or the other, or both, Fixed-frequency transceiver 30 is an integrated transceiver that is configured to communicate only with the fixed-frequency communication protocol. In general, the fixed-frequency communication protocol is any protocol in which a packet or frame of data is communicated within a single frequency channel. Transceiver 35 is the stand-alone counterpart to transceiver 30. A fixed-frequency communication link is illustrated in FIG. 1 with a thin communication bolt designated with numeral 40.

Spread-spectrum transceiver 31 is an integrated transceiver that is configured to communicate only with the spread-spectrum communication protocol. The spread-spectrum communication protocol will be discussed in further detail, but in short, is a protocol that facilitates frequency-channel hopping within a given frequency band. Transceiver 34 is the stand-alone counterpart to transceiver 31. A spread-spectrum communication link is denoted in FIG. 1 with a wide communication bolt and given numeral 45.

Dual-mode transceiver 32 is an integrated transceiver that is configured to communicate with either of the two aforementioned protocols. Transceiver 33 is the stand-alone counterpart to the dual-mode transceiver 32.

Notably, each transceiver can communicate only with another transceiver configured for similar protocols. In other words, a fixed-frequency transceiver 30, 35 cannot communicate with a spread-spectrum transceiver 31, 34. This, however, can be reasonably obviated by deploying dual-mode transceivers 32, 33 into the wireless infrastructure.

Figure 4:
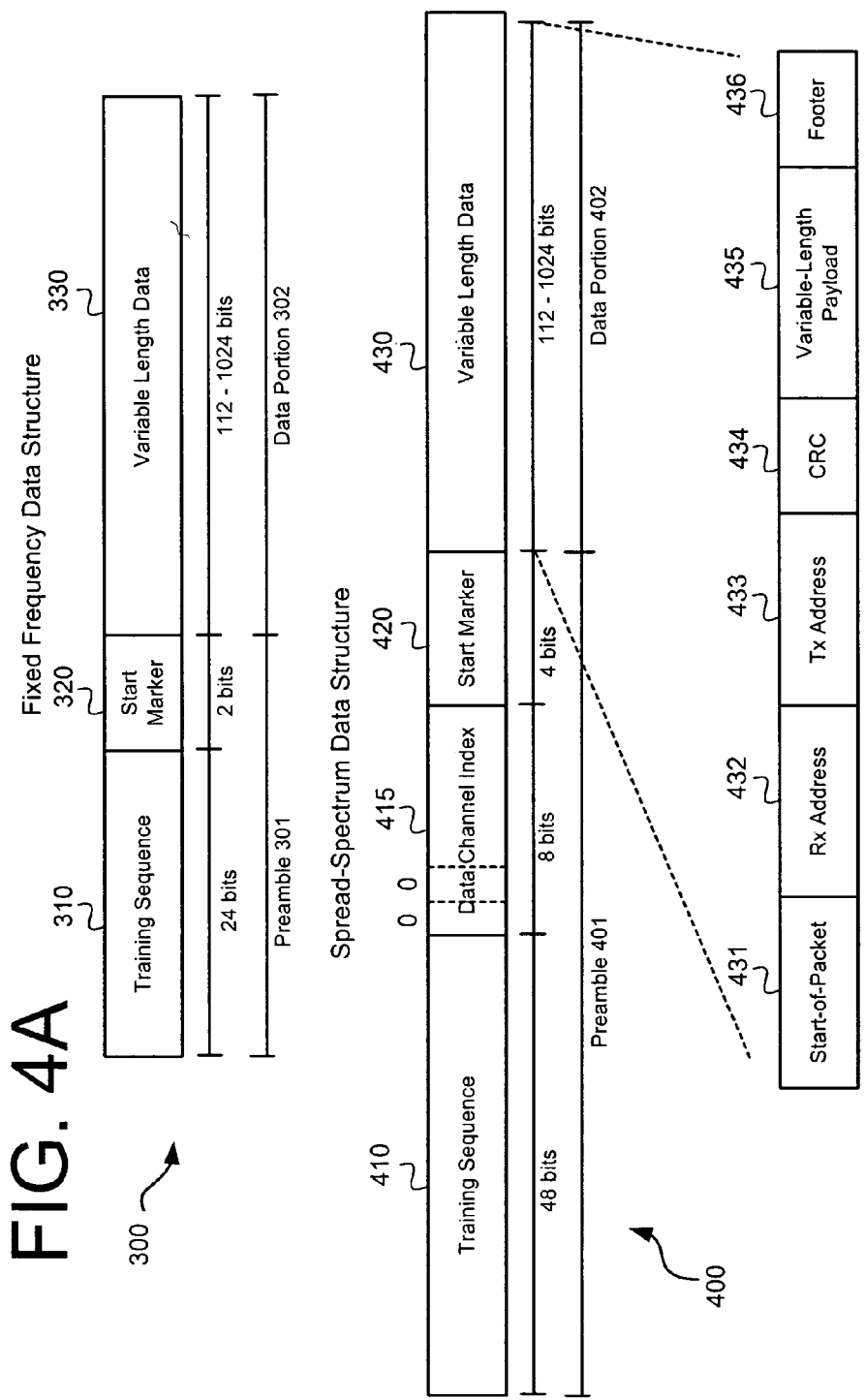
FIG. 4A is a data structure illustrating an embodiment of a fixed-frequency communication packet for the system of FIG. 1.
FIG. 4B is a data structure illustrating an embodiment of a spread-spectrum communication packet for the system of FIG. 1.

The specifics of a fixed-frequency communication 40 will be discussed in further detail in FIG. 4A and the specifics of a spread-spectrum communication 45 will be discussed in further detail in FIG. 4B. Both communications, however, are preferably wireless, RF transmissions, and more preferably, in the 902-928 MHz frequency range. Although this is preferable, in other embodiments, alternative frequency ranges may be employed. Furthermore, each communication may be transmitted over a conductive wire, fiber optic cable, or other transmission media.

The internal architecture of a transceiver 30-32 integrated with a sensor/actuator 10 and a stand-alone transceiver 33-35 will be discussed in more detail in connection with FIG. 2. It will be appreciated by those skilled in the art that integrated transceivers 30-32 can be replaced by RF transmitters (not shown) for client specific applications that only require data collection only.

Local gateways 15 are configured and disposed to receive remote data transmissions from the various stand-alone transceivers 33-35 or integrated transceivers 30-32 having an RF signal output level sufficient to adequately transmit a formatted data signal to the gateways. Local gateways 15 can communicate in either of the two aforementioned communication protocols. Thus, for the purpose of this document, they will be considered dual-mode gateways 15. In other embodiments, local gateways 15 may be capable of communicating in only one of the aforementioned protocols.

Local gateways 15 analyze the transmissions received, convert the transmissions into TCP/IP format (or other protocol), and further communicate the remote data signal transmissions to back-end system 21 via WAN 20. In this regard, and as will be further described below, local gateways 15 may communicate information, service requests, control signals, etc., to integrated transceivers 30-32 from server 25, laptop computer 28, and workstation 27 across WAN 20. Server 25 can be further networked with database server 26 to record client specific data. Server 25, laptop computer 28, and workstation 27 are capable of remotely controlling and/or configuring various functions of the transceivers. For instance, server 26 is capable of remotely controlling the communication protocol in which each transceiver can communicate. This can be accomplished by sending a downstream control signal and/or by sending a software/firmware upgrade downstream.

It will be appreciated by those skilled in the art that if an integrated transceiver (either of 30-32) is located sufficiently close to dual-mode local gateways 15 to receive RF data signals, the RF data signal need not be processed and repeated through stand-alone transceivers 33-35. It will be further appreciated that the system 1 may be used in a variety of environments. In one embodiment, system 1 may be employed to monitor and record utility usage of residential and industrial customers. In another embodiment, system 1 may be configured for the transfer of vehicle diagnostics from an automobile via an RF transceiver integrated with the vehicle diagnostics bus to a local transceiver that further transmits the vehicle information through a local gateway onto a WAN.

Generally, transceivers 30-32 may have similar construction (particularly with regard to their internal electronics) where appropriate, which provides a cost-effective implementation at the system level. Alternatively, fixed-frequency transceiver 30 may include some different internal electronics then spread-spectrum transceiver 31. Furthermore, dual-mode transceiver 32 may include different internal electronics as transceivers 30 and 31. Stand-alone transceivers 33-35 may include similar communication components as their integrated counterparts. The necessary hardware and software to integrate with a sensor/actuator 10 may, however, be excluded.

As illustrated in FIG. 1, stand-alone transceivers 33-35 are disposed to provide adequate coverage in a desired geographic area (e.g., an industrial plant or community), which is based on the particular system application. Preferably, stand-alone transceivers 33-35 may be dispersed so that at least one stand-alone transceiver will pick up a transmission from a given integrated transceiver 30-32. However, in certain instances, two or more stand-alone transceivers may pick up a single transmission. Thus, local gateways 15 may receive multiple versions of the same data transmission signal from an integrated transceiver, but from different stand-alone transceivers. Local gateways 15 may utilize this information to triangulate, or otherwise more particularly assess the location from which the transmission is originating. Due to the transmitting device identification that is incorporated into the transmitted signal, duplicative transmissions (e.g., transmissions duplicated to more than one gateway, or to the same gateway, more than once) may be ignored or otherwise appropriately handled.

Integrated transceivers 30-32 may be implemented in a variety of devices. For example, integrated transceivers 30-32 may be disposed within automobiles, a rainfall gauge, a parking lot access gate, and utility meters to monitor vehicle diagnostics, total rainfall and sprinkler supplied water, access gate position, and utility consumption, to name a few. The advantage of integrating a transceiver, as opposed to a one-way transmitter, into a monitoring device relates to the ability of the transceiver to receive incoming control signals, as opposed to merely transmitting data signals. Significantly, local gateways 15 may communicate with all system transceivers. Since local gateways 15 are integrated with WAN 20, server 25 can host application specific software that is typically hosted in an application specific local controller. Of further significance, the data monitoring and control devices need not be disposed in a permanent location. Provided the monitoring and control devices remain within signal range of a system compatible transceiver, which is within signal range of local gateway 15 interconnected through one or more transceiver networks to server 25. In this regard, small application specific transmitters compatible with system 1 can be worn or carried about one's person or coupled to an asset to be tracked and monitored.

In one embodiment, server 25 collects, formats, and stores client specific data from each of the integrated transceivers 30-32 for later retrieval or access from workstation 27 or laptop 28. In this regard, workstation 27 or laptop 28 can be used to access the stored information through a Web browser in a manner that is well known in the art. In another embodiment, server 25 may perform the additional functions of hosting application specific control system functions and replacing the local controller by generating required control signals for appropriate distribution via WAN 20 and local gateways 15 to the system sensors/actuators. In a third embodiment, clients may elect for proprietary reasons to host control applications on their own WAN connected workstation. In this regard, database 26 and server 25 may act solely as a data collection and reporting device with client workstation 27 generating control signals for the system 1.

It will be appreciated by those skilled in the art that the information communicated by the transceivers 30-35 may be further integrated with other data transmission protocols for transmission across telecommunications and computer networks other than the Internet. In addition, it should be further appreciated that telecommunications and computer networks other than the Internet can function as a transmission path between the transceivers, the local gateways, and the central server. For example, an integrated transceiver may communicate with a stand-alone transceiver in a RF communication scheme. The stand-alone transceiver may communicate with the gateway 15 in a cellular communication scheme, such as GSM or PCS. The gateway 15 may communicate with the back-end system 21 via satellite, POTS, or the Internet.

Figure 2:
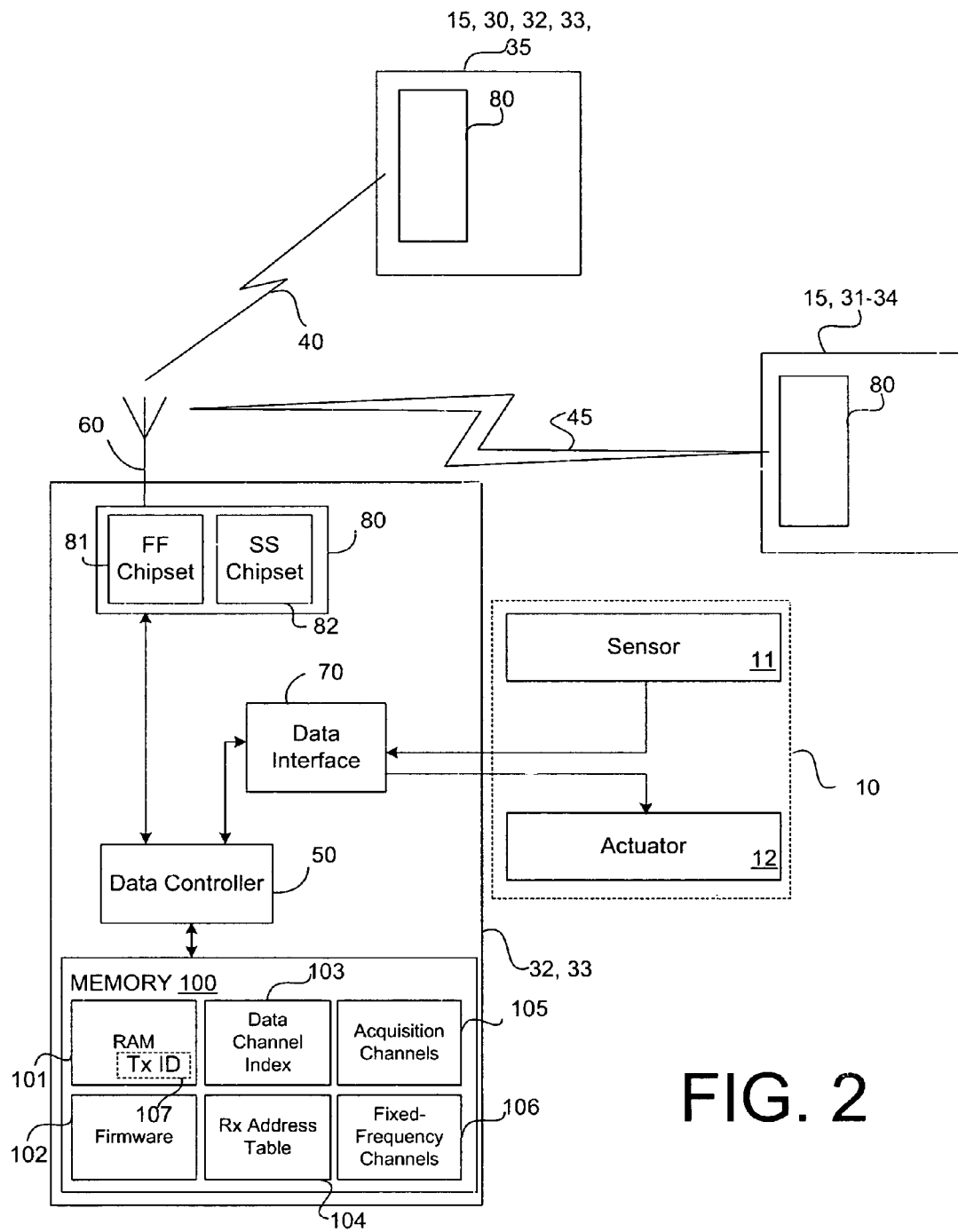
FIG. 2 is a block diagram illustrating the functional components of an embodiment of a dual-mode transceiver of the system of FIG. 1.

Reference is now made to FIG. 2, which is a block diagram that illustrates functional components of an embodiment of a dual-mode transceiver 32, 33. Dual-mode transceiver 32, 33 may communicate with another transceiver 30, 32, 33, and 35 or gateway 15 with the fixed-frequency communication protocol, or may communicate with another transceiver 31-34 or gateway 15 with the spread-spectrum communication protocol.

The integrated dual-mode transceiver 32 is coupled to external devices 10, for example, sensor 11 and actuator 12, by way of data interface 70. Data interface 70 is configured to receive electrical signals from sensor 11 and provide electrical signals to actuator 12, and ultimately convey such information to and from a data controller 50. In one embodiment, data interface 70 may simply comprise an addressable port that may be read by the data controller 50. Dual-mode transceiver 33 is a stand-alone transceiver, thus may not include the data interface 70 for coupling to external components 10, such as sensor 11 and actuator 12.

Data controller 50 is coupled to memory 100 which stores various software, firmware, and other logic. Further coupled with data controller 50 is an RF transceiver 80 which is used to convert information received from data controller 50 in digital electronic form into a format, frequency, and voltage level suitable for transmission from antenna 60 via an RF transmission medium. RF transceiver 80 also converts a received electromagnetic signal from antenna 60 into digital electronic form for data controller 50 to process.

Data controller 50 may be considered a micro-controller or micro-processor and, as such, is configured for performing the data processing for the transceiver 32, 33. Data controller 50 is configured to perform operations as directed by firmware 102 stored in memory 100. These operations include data formatting for communication in both modes of communication, as well as data formatting for communication with sensor 11 and actuator 12 (if so equipped).

RF transceiver 80 of dual-mode transceiver 32, 33 may include distinct chipsets for each communication protocol: a fixed-frequency communication protocol chipset (FF chipset) 81 and a spread-spectrum communication protocol chipset (SS chipset 82). Chipsets 81 and 82 include the necessary components for transmitting and receiving in the particular communication protocols. For example, FF chipset 81 includes the components for communicating in a first modulation scheme, at a given power level, and in a particular frequency band in accordance with the fixed-frequency communication protocol. SS chipset 82 includes the components for communicating in a second modulation scheme, at a given power level, and in another particular frequency band in accordance with the spread-spectrum communication protocol. In other embodiments, the chipsets may be fully integrated.

Fixed-frequency transceivers 30 and 35 may differ from dual-mode transceivers 32 and 33 because they may not include SS chipset 82. Alternatively, data controller 50 for fixed-frequency transceivers 30 and 35 may not be programmed, by firmware 102, for communicating in the spread-spectrum communication protocol. As will be discussed shortly, certain modules of memory 100 which are included in dual-mode transceivers 32 and 35 may not be included in fixed-frequency transceivers 30 and 35.

Likewise, spread-spectrum transceivers 31 and 34 may differ from dual-mode transceivers 32 and 33 because they may not include FF chipset 81. Alternatively, data controller 50 for the spread-spectrum transceivers 31 and 34 may not be programmed, by firmware 102, to communicate in the fixed-frequency communication protocol.

Memory 100 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 100 may incorporate electronic, magnetic, optical, and/or other types of storage media. Memory 100 can have a distributed architecture, where various components are situated remote from one another, but can be accessed by the data controller 50. Modules included in the memory 100 of a dual-mode transceiver 32 and 33 are a data channel index table 103, an acquisition channels table 105, a fixed-frequency channels table 106, a receiver (Rx) address table 104, firmware 102, RAM 101, and a transceiver identification (Tx ID) 107.

The data channel index table 103 is utilized for communication in the spread-spectrum communication protocol. The contents of the data channel index table 103 will become clearer as the spread-spectrum communication protocol is laid out in subsequent figures. In short, the data channel index table 103 includes a list of data channel frequencies in which a data portion of a communication packet may be communicated. Each data channel is given an index that RF transceiver 80 will recognize, and furthermore can be communicated in a preamble of a communication packet. A receiving transceiver 31-34 or gateway 15 will need to recover the data channel index from the preamble to properly receive the remainder of a communication packet. In the preferred embodiment, there are 40 frequency channels dedicated for data communication each channel designated by a unique data channel index. One will appreciate that the number of channels is not relevant. Accordingly, in other embodiments, the number of channels may vary.

The acquisition channels table 105 is utilized for communication in the spread-spectrum communication protocol. The acquisition channels table 105 includes a list of frequency channels designated for synchronizing communication with another transceiver and for communicating a preamble of a communication packet. In the preferred embodiment there are ten designated acquisition channels, although this number can vary. An understanding of the acquisition channels table 105 will become clearer upon further explanation of the spread-spectrum communication protocol.

The fixed-frequency channels table 106 is utilized for communication in the fixed-frequency communication protocol. The fixed-frequency channels table 106 includes a list of frequency channels designated for synchronizing communication and subsequently communicating the data portion of a communication packet. In the preferred embodiment, there are eight fixed-frequency channels. An understanding of the fixed-frequency channels table 106 and its associated fixed-frequency channels will become clearer upon further explanation of the dual-mode communication protocol.

Each transceiver is configured to have a unique identification code 107 (e.g., transceiver identification number—Tx ID), that uniquely identifies the transceiver to the functional blocks of control system 1 (see FIG. 1). This transceiver identification number 107 may be electrically programmable, and implemented in the form of, for example, an EPROM. Alternatively, the transceiver identification number 107 may be set/configured through a series of DIP switches, or stored in RAM. Alternative methods of setting and configuring the transceiver identification number 107 may be implemented.

Rx address table 104 is generally a look-up table of transceiver identification numbers (Tx IDs), or addresses, of other transceivers in a given network in the system 1 and is called upon when preparing a communication packet to be transmitted. Each communication packet transmitted by any transceiver 30-35, or gateway 15, is destined for a particular transceiver as designated by the transceiver identification number 107 embedded within the communication packet for either communication protocol (to be illustrated in FIG. 4). As a transceiver receives various packets, it can distinguish, by the transceiver identification number embedded in the communication packet, whether that packet is destined for that transceiver. Otherwise, the transceiver may disregard the packet and/or relay the packet along to another transceiver. The specifics of how a communication packet is processed upon reception, including relaying the packet, is generally beyond the scope of the present invention.

The Rx address table 104 may also include more information about other transceivers, such as the communication protocol with which the other transceivers communicate. Furthermore, the desired modulation scheme(s) with which the other transceivers communicate as well as a necessary radiating-power level. Importantly some or all of the contents of the Rx address table 104 can be updated remotely, for instance, by server 26.

Firmware 102 includes the logic for operating data controller 50 in accordance with embodiments of the present invention. Logic configured to perform operations as laid out in flow charts illustrated in subsequent figures is found in firmware 102, along with programming logic for communicating with data interface 70 and its coupled components 10. Other programming logic may be incorporated in the firmware 102 as known by those of ordinary skill in the art, such as power conservation sequences, power-up and power-down sequences, and operating system upgrade sequences.

Sensor 11, in its simplest form, could be a two-state device such as a smoke alarm. Alternatively, the sensor 11 may output a continuous range of values to the data interface 70. If the signal output from the sensor 11 is an analog signal, the data interface 70 may include an analog-to-digital converter (not shown) to convert signals output to the actuator 12. Alternatively, a digital interface (communicating digital signals) may exist between the data interface 70 and each sensor 11. In FIG. 2, data interface 70 is shown with a single input from sensor 11. It is easy to envision a system that may include multiple sensor inputs. By way of example, a common home heating and cooling system might be integrated with the present invention. The home heating system may include multiple data interface inputs from multiple sensors. A home thermostat control connected with the home heating system could be integrated with a sensor that reports the position of a manually adjusted temperature control (i.e., temperature set value), as well as, a sensor integrated with a thermostat to report an ambient temperature. The condition of related parameters can be input to data interface 70 as well, including the condition of the system on/off switch, and the climate control mode selected (i.e., heat, fan, or AC). In addition, depending upon the specific implementation, other system parameters may be provided to data interface 70 as well.

The integration with an actuator 12 permits data interface 70 to apply control signals to a manual temperature control for the temperature set point, a climate control mode switch, and a system on/off switch. In this way, a remote workstation 27 or laptop 28 with WAN access (see FIG. 1) could control a home heating system from a remote location.

The operation of an embodiment of transceiver 32, 33 is best illustrated in the flow charts of FIGS. 5-8. However, a brief explanation of the operation should be made with reference to the particular components illustrated in the block diagram of FIG. 2. The dual-mode transceiver 32, 33, as its name implies, can communicate in any one of two modes or protocols: the fixed-frequency communication protocol and the spread-spectrum communication protocol.

Figure 3:
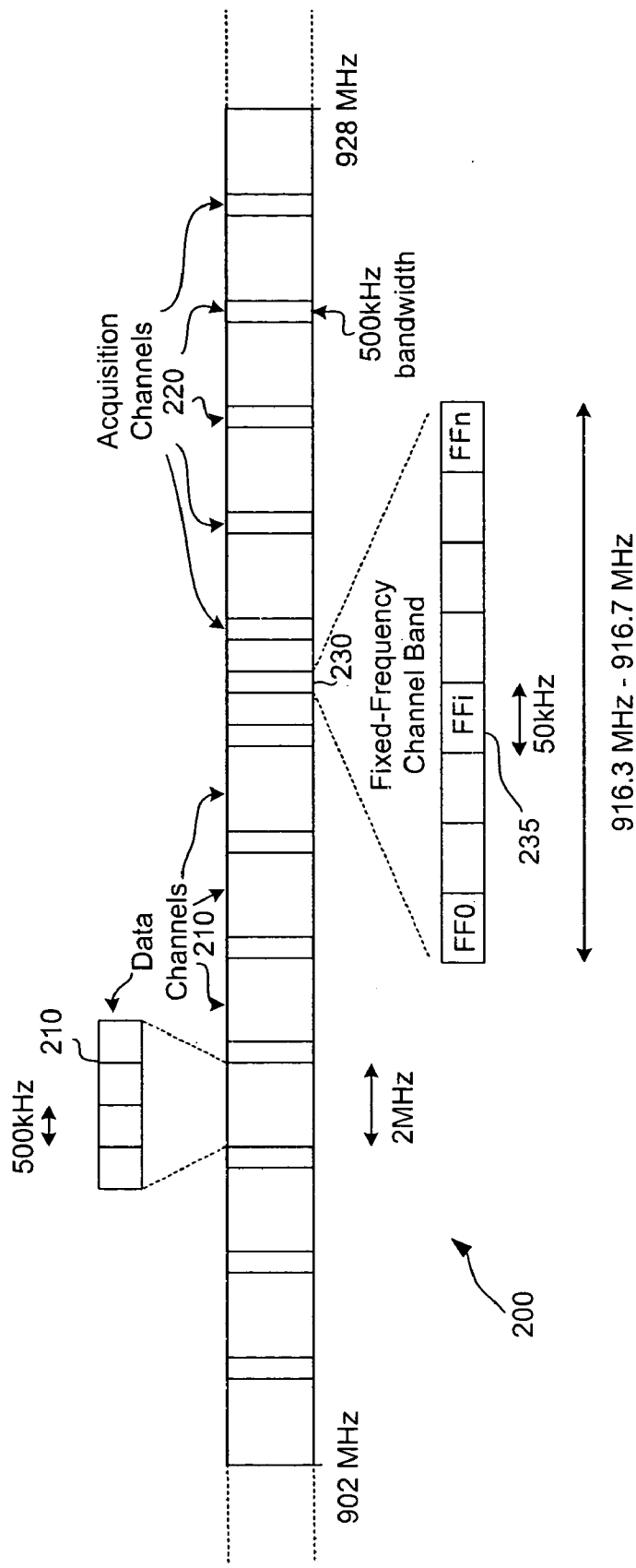
FIG. 3 is an illustration of an exemplary frequency band implemented in the system of FIG. 1.

When transmitting in the fixed-frequency communication protocol, data controller 50 will build a fixed-frequency communication packet (described in FIG. 4A) and pass that along to the RF transceiver 80 for communication. A communication packet is transmitted in the fixed-frequency communication protocol by transmitting at a dedicated channel, where the dedicated channel is one of the fixed-frequency channels (as illustrated in FIG. 3). Preferably, the dedicated channel for transmission is the center channel of the fixed-frequency band, which, in the case of FIG. 3, is the 916.5 MHz channel. Alternatively, building the fixed-frequency communication packet may involve querying the fixed-frequency channels table 106 to find the next fixed-frequency channel in which to communicate. The selected frequency channel is communicated to the FF chipset 81 along with the communication packet. In another alternative, the FF chipset 81 may be configured to cycle through the designated fixed-frequency channels without having to receive an index or pointer to a channel from the memory 100. In this alternative embodiment, the fixed-frequency channel table 106 may be excluded from the memory 100 and stored in memory integrated in with the FF chipset 81. The payload portion of the communication packet is populated with the relevant information to be communicated, which may include information received from the data interface 70. The data controller 50 may query the Rx address table 104 to make sure the destined transceiver can communicate in the fixed-frequency communication mode. After the packet is assembled it is passed along to the transceiver 80 for transmission.

FF chipset may receive in the fixed-frequency communication mode by cycling through the fixed-frequency channels to look for a carrier signal. Once found and synchronized, the packet communicated at that carrier channel is received and passed along to the data controller 50 for processing. Processing of the data may include preparing a reply signal, updating information in memory 100, and/or controlling actuator 12 or other external component 10.

When transmitting in the spread-spectrum communication protocol, the data controller 50 will build a spread-spectrum communication packet (as illustrated in FIG. 4B). The spread-spectrum communication protocol is built by querying the acquisition channels table 105 to find the next acquisition channel in which to send a preamble of the communication packet. Alternatively, the SS chipset 82 may be configured to cycle through the designated acquisition channels without having to receive an index or pointer to a channel from the memory 100. In this alternative embodiment, the acquisition channel table 105 may be excluded from the memory 100 and stored instead in memory integrated with the SS chipset 82. The preamble of the communication packet may also be prepared by querying the data channel index table 103 to find which data channel to communicate the payload portion of the packet. The index to the designated data channel is populated within the preamble. The payload portion of the communication packet is populated and formatted in a similar manner as the fixed-frequency communication protocol calls for. The communication packet is then passed along to RF transceiver 80 for transmission.

SS chipset 82 prepares the preamble of the communication packet for transmission at the designated acquisition channel frequency. Upon completing transmission of the preamble, SS chipset 82 then transmits the remainder of the communication packet at the frequency designated by the data channel index. Typically, this requires SS chipset 82 to change frequency channels mid-communication packet. In some special cases, however, the designated data-channel may be the same as the acquisition channel, which is essentially equivalent to the fixed-frequency communication protocol.

Importantly, communicating with the two communication protocols also provides the opportunity to communicate in two different modulation schemes. This is beneficial because the drawbacks of each can be countered with the advantages of the other. In one embodiment, the fixed-frequency communication protocol uses an amplitude modulation scheme, such as on-off keying (OOK). The spread-spread communication protocol uses a frequency modulation scheme, such as frequency shift-keying (FSK). These are merely exemplary modulation schemes that can be utilized. Those of skill in the art will appreciate that various modulation schemes may be utilized. Furthermore, in some embodiments, the two communication protocols may utilize the same modulation scheme. The particular modulation scheme used for each communication protocol by each transceiver can be remotely controlled by devices in the back-end system 21. Control commands can be received downstream to change the particular modulation scheme to be utilized.

FIG. 3 is an illustration of an embodiment of a preferred frequency band 200 at which the dual-mode transceivers communicate. The illustrated frequency band 200 is the 902-928 MHz band, which falls in the ultra high-frequency (UHF) radio band. Other frequency bands may be utilized. The 902-928 MHz band may be advantageous in certain situations because communication ion this band may not require licensing by the FCC, provided signal radiations remain below a given power threshold.

In the embodiment illustrated in FIG. 3, the 902-928 MHz frequency band is divided into a first set of channels designated as spread-spectrum communication channels and a second set of channels designated as fixed-frequency communication channels. The spread-spectrum communication channels are further divided into subsets of acquisition channels 220 and data channels 210. In the embodiment illustrated in FIG. 3, there are fifty spread-spectrum communication channels, of which ten are designated as acquisition channels 220 and forty are designated as data channels 210. Each channel comprises 500 kHz, with the carrier frequency being centered within the 500 kHz.

In other embodiments, the number of spread-spectrum communication channels, as well as the number of acquisition channels 220 and data channels 210 may be different. Furthermore, in some embodiments, the acquisition channels 220 and data channels 210 may overlap. In order to comply with certain provisions of Part 15 of the FCC's Guidelines for Operation (which is hereby incorporated by reference in its entirety), fifty channels are necessary for spread-spectrum communication. Embodiments of the present invention comply with the FCC's guidelines for communicating at a higher power level. By communicating at a higher power level, longer range communications and/or greater signal penetrations are possible, which is very advantageous for many applications in which system 1 may be utilized.

In one embodiment, the acquisition channels 220 are separated from each other by four data channels 210, thus providing 2 MHz of bandwidth between acquisition channels 220. The acquisition channels 220 are spread evenly across the entire frequency band 200 to spread the power spectral density across the entire frequency band. Again, this pattern can vary greatly, and should not be limited the embodiments illustrated in FIG. 3. For example, the acquisition channels 220 can be grouped together at various sections of the frequency band 200. One must consider, however, complying with the FCC's guidelines when designating the acquisition channels. The acquisition channels 220 may be evenly utilized because each transceiver is configured to cycle through the acquisition channels 220, upon transmission, in either a predetermined and/or pseudorandom pattern. The data channels 210 may also be evenly utilized because each transceiver is configured to cycle through the data channels 210 upon transmission in either a predetermined and/or pseudorandom pattern.

The current FCC guidelines require even usage of channels across an entire bandwidth. In one embodiment, it would appear that the acquisition channels 220 would get 4× more usage then the data channels 210. This may be accounted for, however, by limiting the data throughput at each acquisition channel 220. The total number of data bits communicated in the acquisition channels 220 is about equal to or less than the total number of data bits communicated across the many data channels 210.

Spread-spectrum communication may also be advantageous because it provides for communication from more devices using a given frequency band and greatly reduces the effects of interference. If one channel is currently in use or has some external interference, the transceivers can simply switch to another frequency channel. In one embodiment, the transmitter dictates what the next frequency channel will be by communicating the data channel index in the preamble of a communication packet. Frequency hopping is often used in spread-spectrum communication, which, as its name implies, is generally the process of changing frequency channels in which a transceiver communicates during operation.

As briefly discussed above with respect to FIG. 2, several embodiments of the spread-spectrum communication protocol work by communicating a preamble portion of a communication packet in one of the designated acquisition channels 220. A receiver can cycle through the designated acquisition channels 220 and lock onto a carrier signal at the acquisition channel 220 in which a transmitter is communicating. The receiver then receives the remainder of the preamble, which includes a data channel index field. The receiver then switches to the data channel 210 as designated by the data channel index and prepares to receive the remainder (the data portion) of the communication packet. This will be discussed in further detail in subsequent figures.

The fixed-frequency communication protocol is designated to communicate within another frequency band. In the embodiment illustrated in FIG. 3, the fixed-frequency channel band 230 is confined within one of the channels designated for the spread-spectrum communication protocol. For example, as FIG. 3 illustrates, the fixed-frequency channel band 230 is allotted the 916.3-916.7 MHz frequency band which is slightly smaller then one of the spread-spectrum communication channels of 500 kHz. It should be noted that the frequency band selected for the fixed-frequency communication protocol is merely a preferred frequency band and other frequency bands, including those outside the band dedicated for spread-spectrum communication, could be utilized. Importantly, other components of the dual-mode transceivers are a function of the selected frequency band. For example, antenna 60 may be a dual-frequency antenna for operating in two different frequency bands.

In one embodiment, eight channels 235 (each 50 kHz) are dedicated for fixed-frequency communication with the carrier frequency being centered in each channel 235. Of course, the number of fixed-frequency channels 235 and the allotted bandwidth for each channel 235 can vary.

Important to note is the relatively narrow bandwidth provided for the fixed-frequency channels 235. This is because the illustrated embodiment of the fixed-frequency communication protocol calls for lower power communication and also amplitude modulation. First, with lower power communications, the power spectral density at each carrier frequency is much more focussed at the carrier frequency than higher power communications. Thus, with higher-power communications, more bandwidth is required to allow sufficient separation between the also-wider frequency responses. Second, amplitude modulation, such as OOK, does not require deviation from the carrier frequency, as only the amplitude of the carrier frequency (or a nearby secondary frequency) is being modulated.

A receiving device operating within the fixed-frequency communication protocol, will search for a carrier frequency by cycling through the fixed-frequency channels 235 searching for a carrier frequency. Once locked on to a carrier frequency, the receiver will begin receiving the preamble and also the data portion of a communication packet. Unlike in the spread-spectrum communication protocol, the receiver will not be required to switch to another channel to receive the data portion of the communication packet.

FIG. 4A illustrates an embodiment of a fixed-frequency communication packet, or frame, 300 and FIG. 4B illustrates an embodiment of a spread-spectrum communication packet 400. Both embodiments preferably implement the Manchester encoding scheme. Nonetheless, one of ordinary skill in the art will appreciate that other embodiments may employ other encoding schemes. The Manchester encoding scheme is a bit-level encoding scheme well known in the art for its reliability and ease of timing synchronization. The Manchester encoding scheme translates a binary 1 data bit into a low-to-high transition, at the physical layer level. A binary 0 data bit is thus a high-to-low transition, at the physical layer level. Thus, for each data bit to be transmitted, a full data cycle is required with a 50% duty cycle. Although this cuts the data throughput in half, timing and synchronization is easily accomplished because synchronization can be done at each clock cycle.

Referring to FIG. 4A, the fixed-frequency communication packet 300 includes a preamble portion 301 and a data portion 302, both of which are communicated while at the same frequency channel. The preamble portion 301 includes a training sequence 310, which is composed of a predefined sequence of bits. In one embodiment, the sequence 310 is a series of binary 1s. The length of sequence 310 should be suitable for a receiver to cycle through the designated fixed-frequency channels 235 and look for the sequence. The receiver is configured to look for a subset, such as six or eight consecutive binary 1s. If the receiver receives this subset, the receiver remains at the current fixed-frequency channel 235. Otherwise, the receiver will move on to the next channel. In one embodiment, the training sequence 310 is 24 bits in length. Furthermore, the training sequence 310 could be another sequence besides consecutive binary 1s. Consecutive binary 0s or alternating binary 1s or 0s could be utilized.

As discussed earlier, the Manchester encoding scheme makes timing and synchronization relatively easy. A string of consecutive binary 1s appears to a receiver to be a square wave with a 50% duty cycle (as would a string of consecutive 0s, 180 degrees out of phase). If a receiver receives this square wave for a predefined period (equivalent to the prescribed period of time for the synchronization subset), the receiver will recognize that this data is the start of a communication packet, and timing and synchronization can then be performed with a standard phase lock loop.

As illustrated in FIG. 4A, a start marker 320 is composed of two bits and used to signify the end of the training sequence 310 and the start of the data portion 302 of the communication packet 300. The start marker 320 breaks away from the standard Manchester encoding scheme and is made up of two full clock cycles (thus two bits) of an all high (or on, for OOK) signal. Certainly, other configurations could be utilized.

The data portion 302 of the fixed-frequency communication packet 300 is composed of a variable length payload 330. In one embodiment, the variable length payload 330 is similar to the variable length payload 430 of the spread-spectrum communication packet 400 of FIG. 4B and will be discussed in further detail below.

Turning now to FIG. 4B, the spread-spectrum communication packet 400 is made up of a preamble portion 401 and a data portion 402. In one embodiment, the preamble portion 401 of the spread-spectrum communication packet 400 is communicated at one of the acquisition channels 220 (See FIG. 3). The preamble portion 401 includes a training sequence 410 similar to training sequence 310 and also a data channel index field 415. In the one embodiment, the training sequence 410 is composed of 48 bits, but this may greatly vary in other embodiments. The length of the training sequence 410 should be suitable for a receiver to cycle through all of the acquisition channels 220.

The preamble 401 also includes a data channel index field 415, which communicates to a receiver the data channel at which the data portion 402 of the communication packet 400 will be communicated. In one embodiment, the data channel index field 415 is composed of eight bits. The two most significant bits 415 are binary 0s and the remaining six bits are used to communicate the data channel. The data channel index field 415 also serves to notify a receiver that the communication packet is a spread-spectrum communication packet and not a fixed-frequency communication packet.

A start marker 420 similar to start marker 320 is then included in the communication packet 400. In the embodiment of FIG. 4B, the start marker 420 is composed of four bits and used to signify the end of the preamble 401.

The data portion 402 of the communication packet 400 is composed of a variable length payload 430. Briefly, the variable length payload 430 may include fields, such as a start-of-packet, or header, 431, receiver (Rx) address 432, and transmitter (Tx) address 433. A checksum, cyclic-redundancy check (CRC) 434 or other equivalent error detection scheme could be included in the variable length payload 430. Next, the actual data is transmitted in a variable length payload 435 followed by a footer 436. In one embodiment, the variable length payload 430 can vary from 112 to 1024 bits. The upper limit is defined by the data rate and a maximum dwell time at a particular channel. These parameters may be different in other embodiments, thus varying the length of the data portions of the communication packets. However, the length of the total communication packet should provide for continuous communication at a particular channel, at a given data rate, that is less then the maximum dwell time allotted by the FCC's guidelines. In one embodiment, 400 ms is the maximum dwell time allotted for communication on any frequency channel in the UHF band. The communication packet has a variable length (but not to exceed a given length) and the preferred data rate is 2400 bits per second (bps). This may vary in other embodiments.

The discussion that follows is directed toward the flow charts of FIGS. 5-8. The flow charts of FIGS. 5-8 are intended to illustrate embodiments of methods for communicating in a dual-mode communication protocol. In general, the methods may be embodied in software, hardware, firmware, or any combination thereof, and may be executed by devices, such as those illustrated in the embodiments of FIGS. 1-2.

Figure 5:
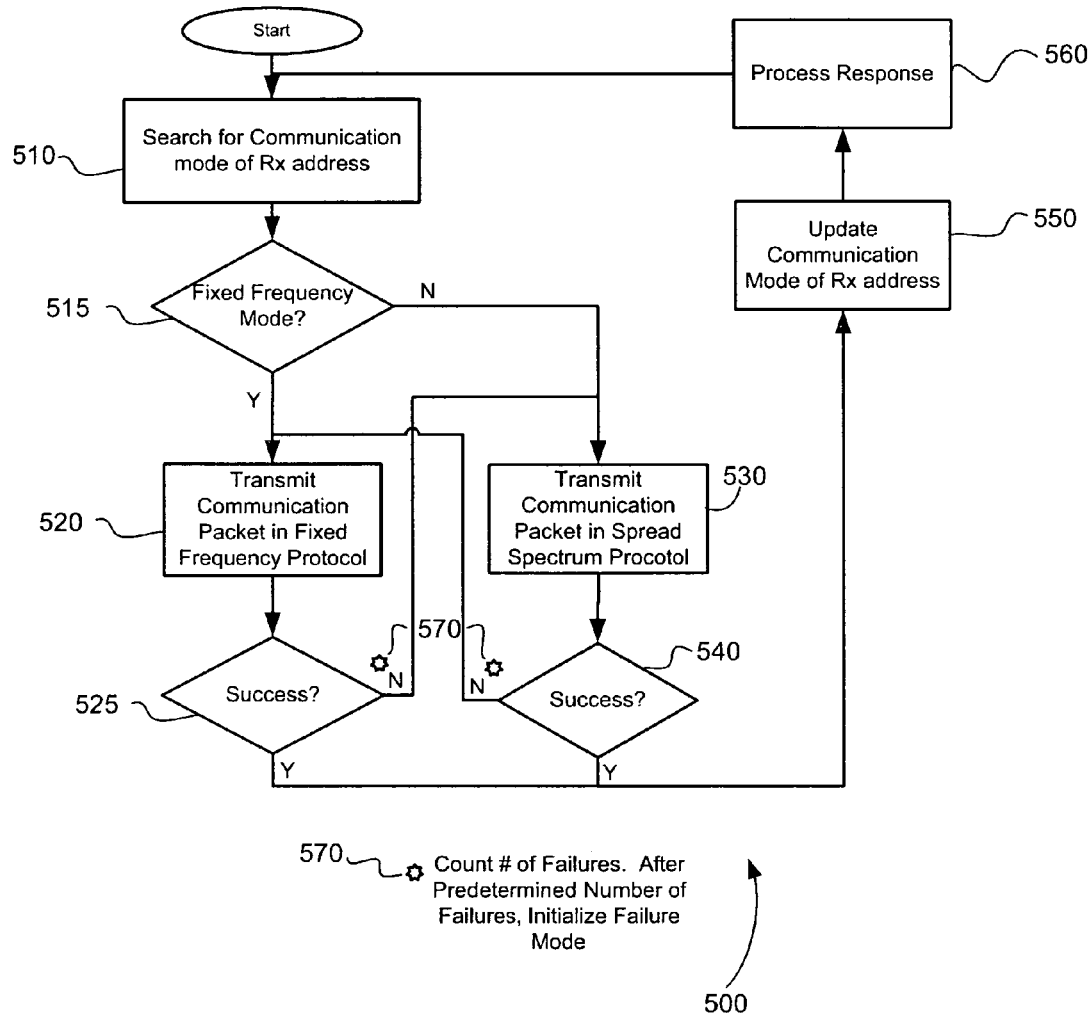
FIG. 5 is a flow chart illustrating an embodiment of a method for transmitting in a dual-mode communication protocol.

FIG. 5 is a flow chart illustrating an embodiment of a method 500 for transmitting in the dual-mode communication mode. Initially, the method 500 begins by receiving a command to transmit a particular communication packet. The communication packet may be generated by the device preparing to transmit, or it may be from another device having just sent the communication packet. In the latter case, the current device serves as a relay or repeater.

The method 500 proceeds by first searching for the communication mode of the intended receiver (step 510). This may be accomplished by examining the Rx address of the intended receiver, where information conveying the communication mode may be found. For example, the two MSBs of the Rx address may be reserved for conveying whether the receiver can communicate in the fixed-frequency communication protocol, the spread-spectrum communication protocol, or both. This may require querying the Rx address table 104 found in memory 100 of a transceiver (see FIG. 2). Alternatively, this information may be found in another table, which is not fully integrated with the Rx address.

If it is determined that the receiver communicates in the fixed-frequency communication protocol (step 515), the transmitter then begins transmission of the communication packet in the fixed-frequency communication protocol (step 520). The fixed-frequency communication protocol operates by communicating the entire communication packet, including the preamble and data portion, while at one frequency channel. Furthermore, the fixed-frequency communication protocol may utilize a particular modulation scheme, such as a particular amplitude modulation scheme. Likewise, the fixed-frequency communication protocol may transmit at a given power level. In the preferred embodiment, the fixed-frequency communication protocol operates at a substantially low-power radiation level. Other modulation schemes and/or power radiation levels could be utilized without departing from the scope of the present invention.

The transmitter may determine whether the transmission was a success (step 525) by receiving a response from the intended receiver. In certain instances, a response may not be required, thus the transmitter may not expect such a response. In these instances, success verification is not necessary and this step may be omitted.

Upon a success, or upon completing transmission of the communication packet if success verification is not necessary, the communication mode of the intended receiver may be updated (step 550), if necessary, and the response communication packet can be processed (step 560). Upon a failure, the method 500 proceeds by attempting to communicate in the spread-spectrum communication protocol (step 530).

Returning back to step 515, if it is determined that the intended receiver does not communicate in the fixed-frequency communication protocol, the transmitter will then begin transmission in the spread-spectrum communication protocol (step 530). This step will be discussed in further detail with relation to FIG. 6.

Upon transmitting the communication packet in the spread-spectrum communication protocol, the transmitting device may then verify whether the transmission was successful by receiving a response from the intended receiver (step 540). If successful, the method 500 proceeds to step 550 where the communication mode of the intended receiver may be updated. The transmitter can then process the response, if necessary (step 560). If not successful, the method 500 proceeds by attempting to transmit the communication packet in the fixed-frequency communication protocol (step 520).

A simple counter can be applied to count the number of failures or attempts at communicating in the two protocols (step 570). After a prescribed number of failures, a failure mode may be initialized, which may include a recalibration feature.

In some situations, the transmitting device may not have knowledge of the communication mode in which the intended receiver operates. In this case, the default procedure is to first attempt communication in the spread-spectrum communication protocol (step 530). If this is successful, the communication mode related to the intended receiver may be updated. If not successful, transmission can be attempted in the fixed-frequency communication protocol. If successful, the communication mode related to the intended receiver can be updated accordingly. Alternatively, the default may be to attempt communication first in the fixed-frequency communication protocol, and then the spread-spectrum communication protocol.

Figure 6:
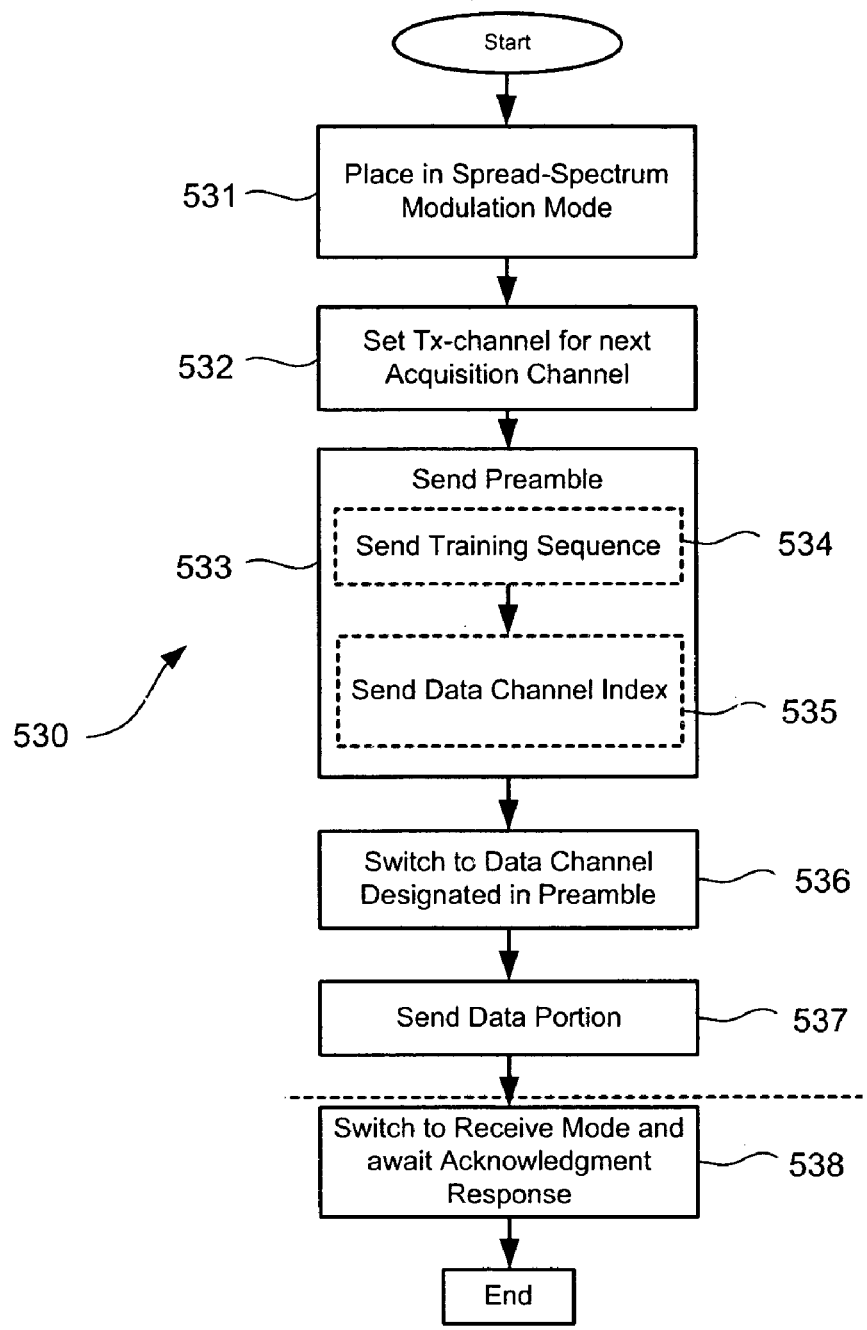
FIG. 6 is a flow chart illustrating an embodiment of a method for transmitting in a spread-spectrum communication protocol.

FIG. 6 is a flow chart illustrating an embodiment of a method 530 for transmitting in the spread-spectrum communication protocol. The method 530 begins by placing the transmitting device in the spread-spectrum modulation mode (step 531). In one embodiment, the spread-spectrum modulation mode utilizes a frequency modulation scheme, such as frequency shift keying (FSK) modulation. In other embodiments, other modulation schemes could be utilized, including those other then frequency modulation schemes. Furthermore, the spread-spectrum communication protocol calls for transmitting at a relatively higher-power radiation power then the fixed-frequency communication protocol. In this manner, the spread-spectrum communication protocol facilitates greater range and signal penetration.

The method 530 proceeds by setting the transmitting channel to the desired acquisition channel (step 532). The desired acquisition channel may be chosen in a predetermined pattern, or randomly.

Once the transmitting channel is set, the preamble of the communication packet can be sent (step 533). This step includes sending the training sequence (step 534) and the data channel index (step 535).

Upon sending the preamble, the transmitting device then switches the transmitting channel to the data channel as designated by the data channel index (step 536). The designated data channel may be selected in a predetermined pattern, or randomly. Subsequently, the data portion of the communication packet (step 537) is sent.

Once the entire communication packet is sent, the transmitting device may then switch to receive mode and await a response acknowledging reception of the communication packet by the intended receiver (step 538). This step may be omitted if no response is necessary. Receive mode is described in further detail in subsequent figures.

Figure 7:
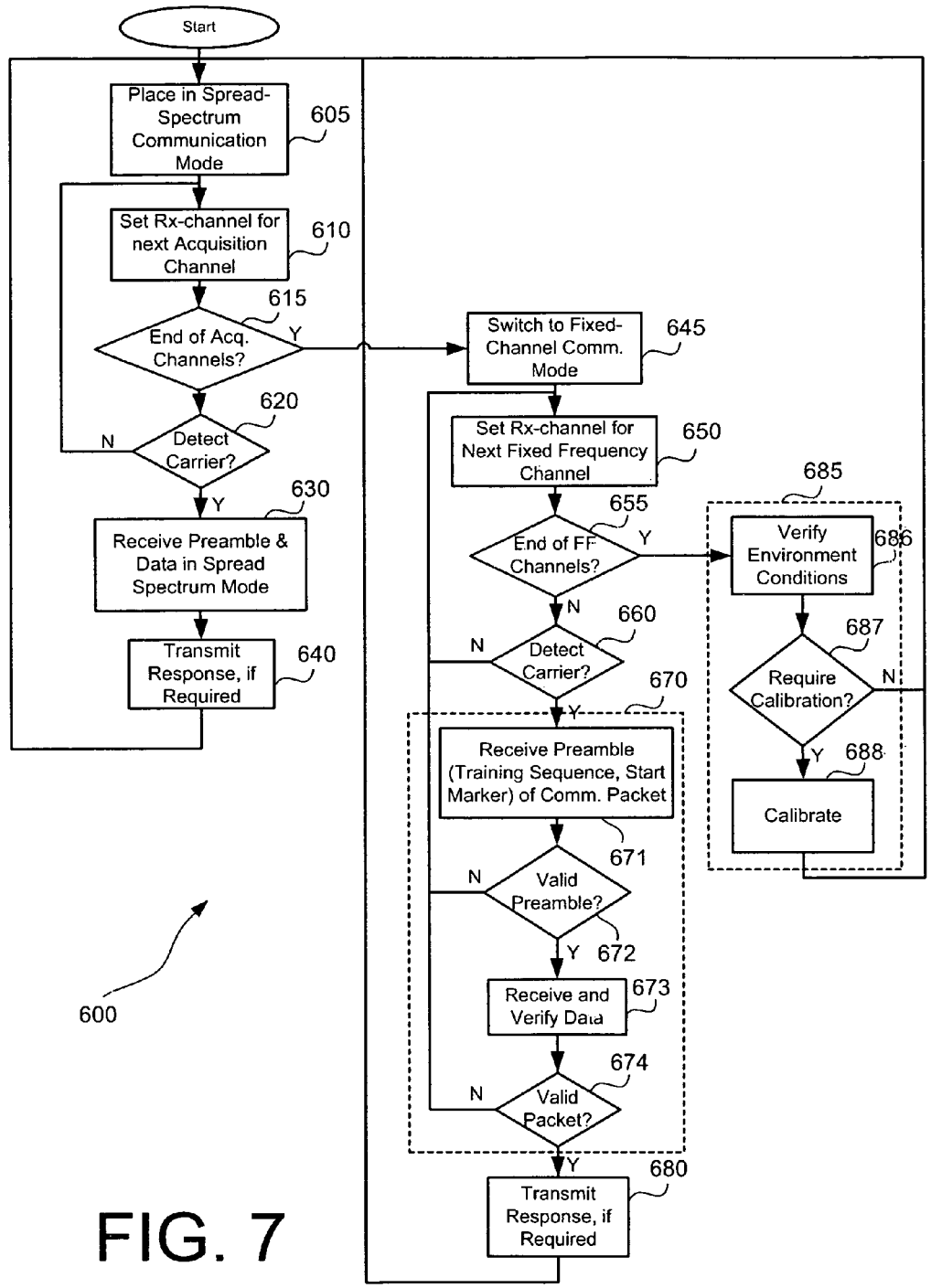
FIG. 7 is a flow chart illustrating an embodiment of a method for receiving in the dual-mode communication protocol.

FIG. 7 is a flow chart illustrating one embodiment of a method 600 for receiving in the dual-mode communication protocol. The method 600 begins by placing the receiving device in one of the communication modes, in this case the spread-spectrum communication mode, which includes setting the demodulation mode to the chosen spread-spectrum modulation/demodulation scheme, as discussed in FIGS. 5 & 6 (step 605).

Next, the receiving channel is set for the next acquisition channel in the sequence or series of acquisition channels (step 610). The sequence or series of acquisition channels may be predetermined and preprogrammed into the firmware of the receiving devices, or may be done in a random or pseudorandom fashion. If it is determined that all of the acquisition channels have been used without detecting a carrier signal (step 615) the method 600 then proceeds with switching to fixed-frequency communication mode, which will be discussed shortly.

At each acquisition channel, a carrier signal is checked for using standard carrier detection techniques as known in the art (step 620). If one is not found at the current acquisition channel, the method 600 returns to step 610, where the receiving channel moves on to the next acquisition channel.

Figure 8:
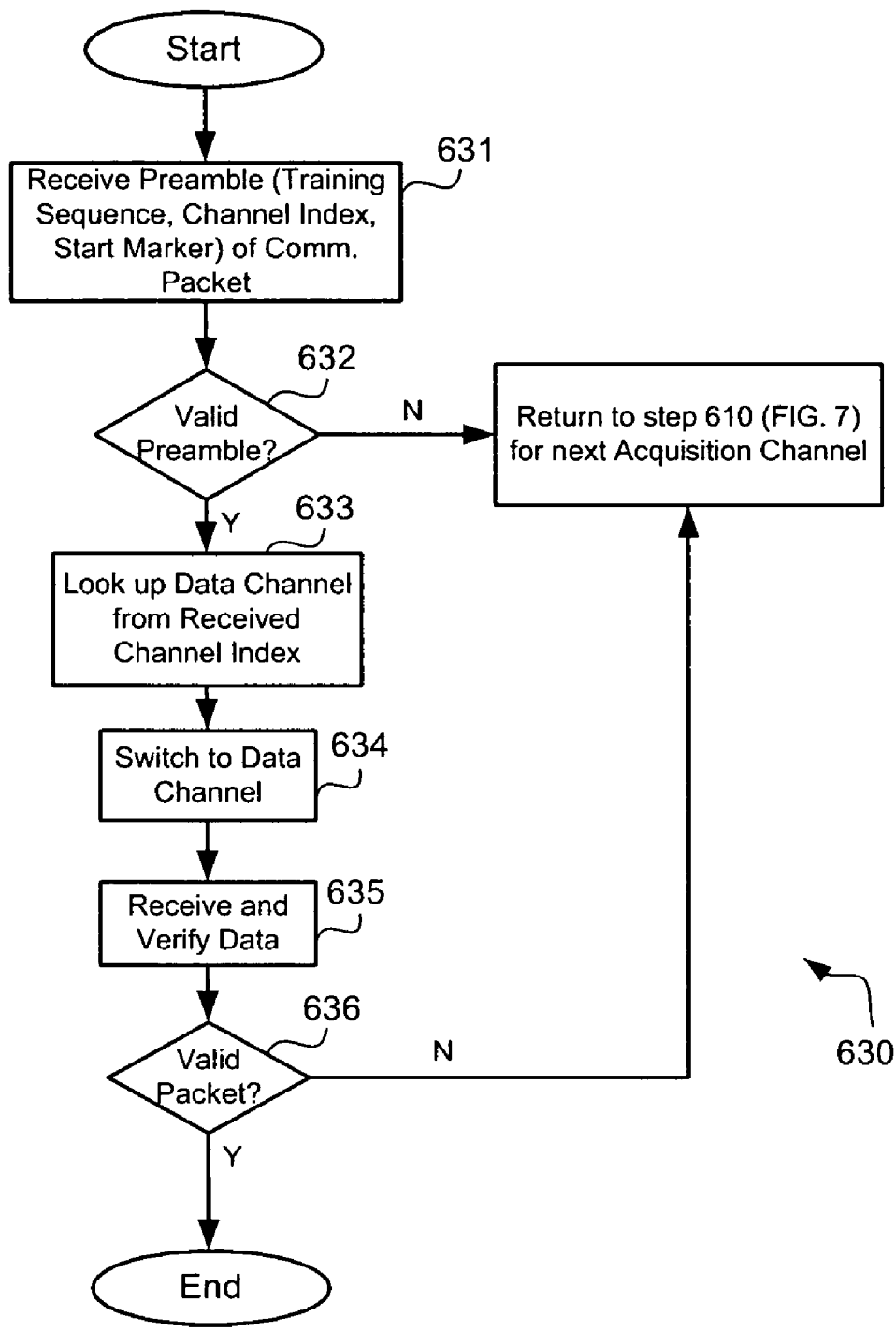
FIG. 8 is a flow chart illustrating an embodiment of a method for receiving in the spread-spectrum communication protocol.

If a carrier signal is detected, the method 600 proceeds with receiving the communication packet in the spread-spectrum communication protocol (step 630), which is discussed in further detail in FIG. 8.

Next, the receiving device transmits a response back to the originating transmitter verifying a successful communication (step 640). Transmitting a successful response may require communicating by way of the methods illustrated in FIGS. 5 & 6. Upon transmitting a response, the receiving device can then return back to the start of the method 600 and prepare for the next communication packet.

As mentioned above, if all of the acquisition channels are cycled through and a carrier signal is not detected (at step 615), the method 600 proceeds to the fixed-frequency communication mode. In this case, the receiving device switches (if necessary) to the fixed-frequency demodulation scheme (step 645). In one embodiment, the fixed-frequency modulation/demodulation scheme is different from the spread-spectrum modulation scheme, thus requiring a switch. Alternatively, however, the two modulation/demodulation schemes may be the same.

Next, the receiving channel is set to the next fixed-frequency channel (step 650). The next fixed-frequency channel may be selected among the designated fixed-frequency channels at random or in a predetermined manner. If it is determined that all of the fixed-frequency channels have been traversed without detecting a carrier signal (step 655), a recalibration procedure may be initiated (step 685). The recalibration procedure may not, however, be initiated until after a significant number of traversals of the acquisition channels and fixed-frequency channels without a carrier signal detection.

If a carrier signal is detected at step 660, the receiving device locks on and synchronizes communication by receiving the training sequence in the preamble of the communication packet. The remainder of the communication packet, including the data portion is then received at the current receiving channel (step 670).

Included within the step of receiving the entire communication packet (step 670) are several points at which the integrity of the data is verified. First, the receiving device receives the preamble of the communication packet (step 671). Next, the preamble is verified to determine whether it is a valid preamble (step 672). If not, the method 600 may return to step 650 where a new fixed-frequency channel is selected. If a valid preamble is detected, the receiving device receives and verifies the remainder of the communication packet (step 673). If the communication packet is invalid, it may be ignored and the method resumes back to step 650. If the communication packet is valid, the receiving device may then switch to transmission mode and transmit a response (step 680).

The recalibration procedure (step 685) may greatly vary with other embodiments. In one embodiment, particular environment conditions can be verified to determine whether drastic changes have occurred which could result in device malfunctions (step 686). For example, drastic operating temperature changes or ambient temperature changes could be verified to determine whether they are the cause of a possible device malfunction. In practice, environmental conditions such as these take time to change, thus the recalibration procedure may be performed at certain intervals of time, perhaps every 1000 fixed-frequency channel cycles, as an example. If recalibration is necessary (step 687), a recalibration protocol could be enabled (step 688).

The method 600 may return back to the spread-spectrum communication mode at step 605. In other embodiments, it is entirely foreseeable that the fixed-frequency communication mode is the first mode chosen, as opposed to the spread-spectrum communication mode. In this case, a receiving device would first attempt to receive in the fixed-frequency communication mode and then switch to the spread-spectrum communication mode after cycling through all of the fixed-frequency channels.

FIG. 8 is a flow chart illustrating an embodiment of a method 630 for receiving in the spread-spectrum communication protocol. The method 630 begins once a carrier signal has been detected at a particular acquisition channel. A receiving device then receives a preamble portion of a communication packet, which includes a training sequence and data channel index (step 631). The training sequence, as discussed earlier, is used to synchronize the timing for the receiving device.

Once the preamble is received, the receiving device may verify whether the preamble is valid (step 632). If not, the receiving device may return back to step 610 and switch to the next acquisition channel.

If the preamble is valid, the method 630 proceeds with looking up the data channel corresponding to the received data channel index in the preamble (step 633). Once established, the receiving device switches to the designated data channel, if necessary (step 634). In certain instances, where the acquisition channels and data channels overlap, it may be possible for the data channel index to indicate to the receiving device to remain at the current channel for data reception. For example, the special case of six binary 1s may indicate to the receiving device to remain at the current acquisition channel for data reception.

The data portion of the communication packet is then received and verified for integrity (step 635). If the communication packet is found to be invalid, the receiving device may revert back to step 610 where the next acquisition channel is selected. If the communication packet is found to be valid, method 630 ends, and the receiving device prepares to transmit a response, if necessary.

The embodiment or embodiments discussed were chosen and described to illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method of communicating with a multi-mode communication protocol in a given frequency band composed of a plurality of channels, wherein a first set of the plurality of channels are designated fixed-frequency channels and a second set of the plurality of channels are designated spread-spectrum channels, the spread-spectrum channels being composed of a first subset of acquisition channels and a second subset of data channels, the acquisition channels separated by data channels, the method comprising:

enabling communication in a spread-spectrum communication mode;
attempting to receive a communication packet by traversing through the subset of acquisition channels;
upon receiving a communication packet,
   switching to a data channel designated by the communication packet; and
   receiving and verifying a data portion of the communication packet by communicating in the designated data channel;
upon not receiving a communication packet after traversing through the subset of acquisition channels,
   enabling communication in a fixed-frequency communication mode;
   attempting to receive a communication packet by traversing through the designated fixed-frequency channels and searching for a training sequence in the preamble of the communication packet; and
   upon receiving a communication packet, receiving and verifying a data portion of the communication packet by maintaining communication in the current fixed-frequency channel.

2. The method of claim 1, wherein enabling communication in a spread-spectrum communication mode comprises:
setting a current modulation protocol to a frequency shift keying (FSK) protocol.

3. The method of claim 1, wherein enabling communication in a fixed-frequency communication mode comprises:
setting a current modulation protocol to an on-off keying (OOK) protocol.

4. A method for communicating in a dual-mode communication protocol, the method comprising:
enabling communication in a spread-spectrum communication protocol, comprising:

receiving a first portion of a communication frame at a first frequency channel, wherein the first portion of the communication frame comprises a data channel index that indicates a second frequency channel for receiving a second portion of the communication frame;

wherein the first frequency channel is one of a subset of acquisition channels, and the second frequency channel is one of a subset of data channels, wherein the acquisition and data channels are subsets of channels designated for spread-spectrum communication, and wherein the spread-spectrum communication protocol further comprises:

cycling through the subset of acquisition channels until synchronizing with a transmitter, whereupon the channel at which synchronization occurs is the first frequency channel;

receiving a predefined synchronization pattern, wherein the predefined synchronization pattern is found within a training sequence field of the first portion of the communication frame;

switching to the second frequency channel;

receiving the second portion of the communication frame at the second frequency channel;

upon not synchronizing with a transmitter, enabling communication in a fixed-frequency communication protocol, wherein the fixed-frequency communication protocol comprises:

receiving the entire communication frame at a third frequency channel, wherein the third frequency channel is one of a subset of fixed-frequency channels.

5. The method of claim 4, wherein enabling communication in a fixed-frequency communication protocol comprises enabling communication in a first modulation scheme, and wherein enabling communication in a spread-spectrum communication protocol comprises enabling communication in a second modulation scheme.

6. The method of claim 5, wherein the first modulation scheme is the same as the second modulation scheme.

7. The method of claim 5, wherein the first modulation scheme is an amplitude modulation scheme.

8. The method of claim 7, wherein the amplitude modulation scheme is an on-off keying (OOK) modulation scheme.

9. The method of claim 5, wherein the second modulation scheme is a frequency modulation scheme.

10. The method of claim 9, wherein the frequency modulation scheme is a frequency shift keying (FSK) modulation scheme.

11. A method for communicating data, the method comprising:

enabling communication in a spread-spectrum communication protocol, the spread spectrum communication protocol comprising:

transmitting a first portion of a communication frame at a first frequency channel, wherein the preamble of the first portion of the communication frame comprises a data channel index that indicates a second frequency channel for communicating a second portion of the communication frame;

determining whether to communicate in the spread-spectrum communication protocol or a fixed-frequency communication protocol;

examining a receiver address field of the communication frame to determine whether an intended receiver communicates in the spread-spectrum communication protocol or the fixed-frequency communication protocol;

upon communicating the communication frame, receiving an acknowledgement response from the intended receiver;

updating the receiver address field of the intended receiver;

switching to the second frequency channel;

transmitting the second portion of the communication frame at the second frequency channel;

upon determining to communicate in the fixed-frequency communication protocol, enabling communication in the fixed-frequency communication protocol, wherein the fixed-frequency communication protocol comprises transmitting the first and second portions of the communication frame in a third frequency channel.

12. The method of claim 11, wherein the first frequency channel is one of a subset of acquisition channels, and the second frequency channel is one of a subset of data channels, wherein the acquisition and data channels are subsets of a first set of channels designated for spread-spectrum communication, and wherein the third frequency channel is one of a second set of channels designated for fixed-frequency communication.

13. The method of claim 11, wherein enabling communication in a fixed-frequency communication protocol comprises enabling communication in a first modulation scheme, and wherein enabling communication in a spread-spectrum communication protocol comprises enabling communication in a second modulation scheme.

14. The method of claim 13, wherein the first modulation scheme is the same as the second modulation scheme.

15. The method of claim 13, wherein the first modulation scheme is an amplitude modulation scheme.

16. The method of claim 15, wherein the amplitude modulation scheme is an on-off keying (OOK) modulation scheme.

17. The method of claim 13, wherein the second modulation scheme is a frequency modulation scheme.

18. The method of claim 17, wherein the frequency modulation scheme is a frequency shift keying (FSK) modulation scheme.

19. The method of claim 13, wherein enabling communication in the fixed-frequency communication protocol further comprises:

enabling communication in a relatively low-power transmission mode.

20. The method of claim 13, wherein enabling communication in the spread-spectrum communication protocol further comprises:

enabling communication in a relatively high-power transmission mode.

21. A dual-mode transceiver, comprising: means for communicating in a spread-spectrum communication protocol, said means comprising:

means for receiving in the spread-spectrum communication protocol, comprising:

means for receiving at a first frequency channel a first portion of a communication frame that comprises a data channel index that indicates a second frequency channel for receiving a second portion of the communication frame;

wherein the first frequency channel is one of a subset of acquisition channels, and the second frequency channel is one of a subset of data channels, wherein the acquisition and data channels are subsets of channels designated for spread-spectrum communication, and wherein said means for receiving in the spread-spectrum communication protocol further comprises:

means for cycling through the subset of acquisition channels;
  means for synchronizing with a transmitter, whereupon the acquisition channel at which synchronization occurs is the first frequency channel;
  means for receiving a predefined synchronization pattern, wherein the predefined synchronization pattern is found within a training sequence field of the first portion of the communication frame;
  means for switching to the second frequency channel designated by the data channel index;
  means for receiving the second portion of the communication frame at the second frequency channel;
 means for switching from receiving in the spread-spectrum communication protocol to receiving in the fixed-frequency communication protocol upon not synchronizing with a transmitter in the spread-spectrum communication protocol;
 means for communicating in a fixed-frequency communication protocol, comprising:
  means for receiving in the fixed-frequency communication protocol, comprising:
   means for receiving the entire communication frame at a third frequency channel, wherein the third frequency channel is one of a subset of fixed-frequency channels.

22. The transceiver of claim 21, wherein said means for communicating in the spread-spectrum communication protocol further comprises:
 means for transmitting in the spread-spectrum communication protocol, comprising:
  means for transmitting a first portion of a communication frame at a first frequency channel, wherein the first portion of the communication frame comprises a data channel index that indicates a second frequency channel for communicating a second portion of the communication frame;
  means for switching to the second frequency channel; and
  means for transmitting the second portion of the communication frame at the second frequency channel.

23. The transceiver of claim 22, further comprising:
 means for communicating in a fixed-frequency communication protocol, comprising:
  means for transmitting in the fixed-frequency communication protocol, comprising:
   means for transmitting the first and second portions of the communication frame in a third frequency channel.

24. The transceiver of claim 23, wherein said means for transmitting in the spread-spectrum communication protocol further comprises means for transmitting at a first radiating-power level, and wherein said means for transmitting in the fixed-frequency communication protocol further comprises means for communicating at a second radiating-power level.

25. The transceiver of claim 24, wherein the first radiating-power level is higher then the second radiating-power level.

26. The transceiver of claim 24, wherein the second radiating-power level is a substantially low power level.

27. The transceiver of claim 23, further comprising:
 means for determining whether to transmit in the spread-spectrum communication protocol or the fixed-frequency communication protocol.

28. The transceiver of claim 24, wherein said means for determining comprises:
 means for examining a receiver address field of the communication frame to determine whether an intended receiver communicates in the spread-spectrum communication protocol or the fixed-frequency communication protocol.

29. The transceiver of claim 25, further comprising:
 means for receiving an acknowledgement response from the intended receiver; and
 means for updating the receiver address field of the intended receiver.

30. The transceiver of claim 21, wherein said means for communicating in the fixed-frequency communication protocol further comprises means for communicating in a first modulation scheme, and wherein said means for communicating in the spread-spectrum communication protocol comprises means for communicating in a second modulation scheme.

31. The transceiver of claim 30, wherein the first modulation scheme is the same as the second modulation scheme.

32. The transceiver of claim 30, wherein the first modulation scheme is an amplitude modulation scheme.

33. The transceiver of claim 32, wherein the amplitude modulation scheme is an on-off keying (OOK) modulation scheme.

34. The transceiver of claim 30, wherein the second modulation scheme is a frequency modulation scheme.

35. The transceiver of claim 34, wherein the frequency modulation scheme is a frequency shift keying (FSK) modulation scheme.

* * * * *